(12) United States Patent
Kubena

(10) Patent No.: US 7,232,700 B1
(45) Date of Patent: *Jun. 19, 2007

(54) INTEGRATED ALL-SI CAPACITIVE MICROGYRO WITH VERTICAL DIFFERENTIAL SENSE AND CONTROL AND PROCESS FOR PREPARING AN INTEGRATED ALL-SI CAPACITIVE MICROGYRO WITH VERTICAL DIFFERENTIAL SENSE

(75) Inventor: Randall L. Kubena, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/008,715

(22) Filed: Dec. 8, 2004

(51) Int. Cl.
*H01L 21/00* (2006.01)

(52) U.S. Cl. .................. 438/51; 257/417; 257/E21.499; 73/504.14

(58) Field of Classification Search .................. 438/51, 438/52; 257/415, 417, 418, E21.488; 73/504.08, 73/504.18, 503.3, 504.02, 504.14
See application file for complete search history.

(56) References Cited

U.S. PATENT DOCUMENTS

| 5,001,940 | A |   | 3/1991  | Ogawa ........................ 74/5.6 D |
|-----------|---|---|---------|----------------------------------------|
| 5,134,881 | A |   | 8/1992  | Henrion et al. ............ 73/517 R    |
| 5,203,208 | A | * | 4/1993  | Bernstein .................. 73/504.12  |
| 5,313,835 | A |   | 5/1994  | Dunn ........................... 73/505 |
| 5,377,544 | A |   | 1/1995  | Dunn ........................... 73/505 |
| 5,490,420 | A | * | 2/1996  | Burdess ..................... 73/504.02 |
| 5,511,419 | A |   | 4/1996  | Dunn ......................... 73/504.08 |
| 5,756,895 | A | * | 5/1998  | Kubena et al. ........... 73/504.15     |
| 5,894,090 | A |   | 4/1999  | Tang et al. ............... 73/504.02   |
| 6,079,272 | A |   | 6/2000  | Stell et al. ................. 73/504.12 |
| 6,164,134 | A |   | 12/2000 | Cargille ..................... 73/504.02 |
| 6,297,072 | B1| * | 10/2001 | Tilmans et al. .............. 438/106    |
| 6,405,594 | B1| * | 6/2002  | Tang et al. ............... 73/504.02   |
| 6,487,907 | B1| * | 12/2002 | Tang et al. ............... 73/504.02   |
| 6,539,801 | B1|   | 4/2003  | Gutierrez et al. ......... 73/504.12    |
| 6,555,404 | B1|   | 4/2003  | Kubena et al. ............... 438/22    |
| 6,584,845 | B1|   | 7/2003  | Gutierrez et al. ......... 73/514.15    |
| 6,629,460 | B2|   | 10/2003 | Challoner .................. 73/504.2   |
| 6,698,287 | B2|   | 3/2004  | Kubena et al. ........... 73/514.15     |
| 6,758,093 | B2|   | 7/2004  | Tang et al. ................. 73/504.2  |

(Continued)

OTHER PUBLICATIONS

U.S. Appl. No. 10/933,853, filed Sep. 3, 2004, Kubena et al.

(Continued)

*Primary Examiner*—Chandra Chaudhari
*Assistant Examiner*—Steven J. Fulk
(74) *Attorney, Agent, or Firm*—Ladas & Parry

(57) ABSTRACT

The present invention relates to a method of manufacturing a cloverleaf microgyroscope containing an integrated post comprising: attaching a post wafer to a resonator wafer, forming a bottom post from the post wafer being attached to the resonator wafer, attaching the resonator wafer to a base wafer, wherein the bottom post fits into a post hole in the base wafer, forming a top post from the resonator wafer, wherein the bottom and top post are formed symmetrically around the same axis, preparing a cap with backside metallization, and attaching a cap wafer on top of the base wafer. The present invention relates further to a gyroscope containing an integrated post with on or off-chip electronics.

20 Claims, 27 Drawing Sheets

U.S. PATENT DOCUMENTS

| | | | |
|---|---|---|---|
| 6,796,179 B2 * | 9/2004 | Bae et al. | 73/504.12 |
| 6,841,838 B2 * | 1/2005 | Kubena et al. | 257/415 |
| 6,944,931 B2 | 9/2005 | Shcheglov et al. | 29/595 |
| 7,015,060 B1 * | 3/2006 | Kubena et al. | 438/50 |
| 2003/0217915 A1 * | 11/2003 | Ouellet et al. | 204/192.15 |
| 2003/0230798 A1 * | 12/2003 | Lin et al. | 257/704 |
| 2004/0016995 A1 * | 1/2004 | Kuo et al. | 257/678 |
| 2004/0077117 A1 * | 4/2004 | Ding et al. | 438/51 |
| 2004/0099909 A1 * | 5/2004 | Park et al. | 257/347 |
| 2004/0237626 A1 * | 12/2004 | Challoner et al. | 73/1.38 |
| 2005/0054133 A1 * | 3/2005 | Felton et al. | 438/50 |

OTHER PUBLICATIONS

U.S. Appl. No. 11/008,721, filed Dec. 8, 2004, Kubena et al.

Johnson, J.J., et al., "Fabrication of Silicon Masters for Micro-Contact Printing," *National Nanofabrication Users Network*, The Penn State Nanofabrication Facility, pp. 48-49 (2000).

Milanovic, V., et al., "A Simple Process for Lateral Single Crystal Silicon Nanowires," *Proceedings of IMECE '02, ASME International Mechanical Engineering Congress & Exposition*, New Orleans, Louisiana, pp. 1-7 (Nov. 17-22, 2002).

Milanovic, V. et al., "Deep Reactive Ion Etching for Lateral Field Emission Devices," *IEEE Electron Device Letters*, vol. 21, No. 6, pp. 271-273 (Jun. 2000).

Tang, T.K., et al., "Silicon Bulk Micromachined Vibratory Gyroscope," *Solid-State Sensor and Actuator Workshop*, Hilton Head, South Carolina, pp. 288-293 (Jun. 2-6, 1996).

Via, A., et al., "Metal Lift-Off on InP HBTs Using Carbon Dioxide Snow Spray," Internet: http://www1.boc.com/eco-snow/pdf/CS-MAX%202002.pdf 3 pages total (2002).

* cited by examiner

INTEGRATED ALL-SI CAPACITIVE MICROGYRO WITH VERTICAL DIFFERENTIAL SENSE AND CONTROL AND PROCESS FOR PREPARING AN INTEGRATED ALL-SI CAPACITIVE MICROGYRO WITH VERTICAL DIFFERENTIAL SENSE

BACKGROUND OF THE INVENTION

1. Field of the Invention

The present invention refers to an integrated all-Si capacitive microgyroscope with vertical differential Sense and Control and process for preparing an integrated all-Si capacitive microgyro with vertical differential Sense.

2. Description of Related Art

U.S. Pat. No. 5,894,090 to Tang et al., which is incorporated herein by reference, discloses a micromachined symmetrical leaf structure having a plurality of symmetrically disposed leaves about a defined center. At least one micromachined spring is disposed symmetrically with respect to the symmetrical leaf structure and supporting the symmetrical leaf structure, a rim/base structure to which the spring is coupled. The rim/base structure includes a plurality of sensing and drive electrodes and a circuit electrically coupled to the electrodes included within the rim/base structure. The circuit provides drive signals to the drive electrodes to oscillate the symmetrical leaf structure and to receive a sensing signal from the sensing electrodes to detect response of the oscillating symmetrical leaf structure to physical phenomena exterior to the micromachined resonator. The micromachined resonator has a manually inserted post. It shows a lack of a silicon based vacuum encapsulation. A low yield is obtained during the separation. The manufacturing of the resonator involves high fabrication costs. It shows large vibration sensitivity and no clear path to electronic integration.

The known manufacturing processes make it very difficult to manufacture a microgyroscope. The central post is inserted by hand, the device has to be vacuum packaged in a custom package and there is no ability to integrate control electronics with the silicon structure.

What is needed is a cloverleaf microgyroscope and a process for manufacturing a cloverleaf microgyroscope with an integrated central post and electronics with the resonator and vacuum package at wafer-level with a single crystal silicon construction.

BRIEF SUMMARY OF THE INVENTION

This invention addresses the above needs.

One aspect of the present invention is a method of manufacturing a process for preparing an integrated all-Si capacitive microgyro with vertical differential Sense comprising:

a) attaching a post wafer to a resonator wafer,
b) forming a bottom post from the post wafer,
c) attaching the resonator wafer to a base wafer, wherein the bottom post fits into a post hole in the base wafer,
d) forming a top post from the resonator wafer, wherein the bottom and top post are formed symmetrically around the same axis,
e) preparing a cap with backside metallization, and
f) attaching a cap wafer on top of the base wafer.

Another aspect of the present invention is an integrated all-Si capacitive microgyro with vertical differential Sense manufactured by this method.

For improved vibration immunity, a set of control and sense electrodes located above the resonator offers advantages. This invention refers to a method for adding an array of bump bonds on the base wafer that then forms electrical interconnects to the top electrodes when the capping wafer is bonded to the base wafer. A cut-out in the resonator frame allows the interconnects to be connected to the top electrodes without having to transverse deep groves. The height of the added bump bonds are adjustable to be equal to the metal seal ring on the base wafer so that vacuum sealing and top electrode connection is performed in the same bonding step.

Since the resonator is supported by four springs attached to an outer frame, any vibration along the axis of the post can deflect the resonator and thereby change the gap spacing between the resonator and the electrodes. This change in gap spacing results in changes in the detected capacitance for a given absolute deflection and changes in the rebalance force for a given applied voltage. By using differential detection and drive, these changes can be minimized, but not totally eliminated, and thereby the scale factor of the device can be stabilized during high loading.

BRIEF DESCRIPTION OF THE SEVERAL VIEWS OF THE DRAWINGS

These and other features, aspects and advantages of the present invention will become better understood with reference to the following description, appended claims, and accompanying drawings where

DETAILED DESCRIPTION

Figure 1A:
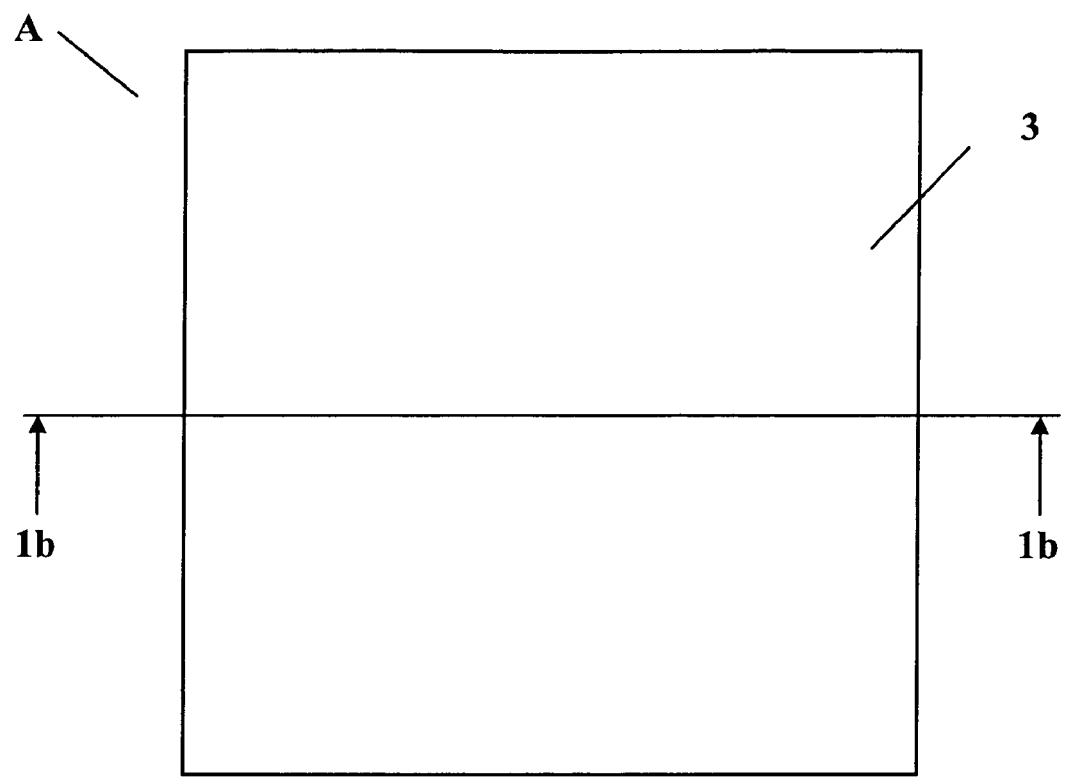
FIG. 1a is a top plan view of the preferred starting material of a resonator SOI wafer A and FIG. 1b is a cross-sectional view through wafer A of FIG. 1a at line 1b—1b of the resonator SOI wafer A.
Figure 1B:
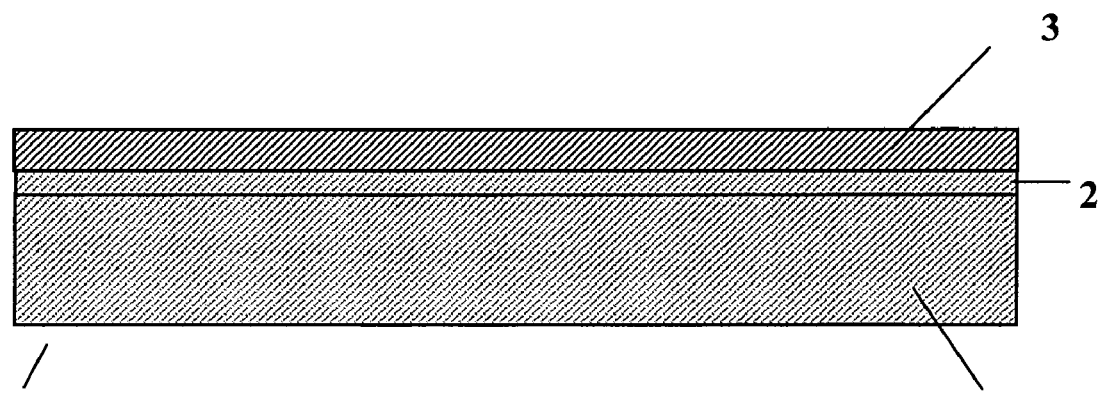

The resonator wafer A, preferably a silicon-on-insulator (SOI) wafer, is preferably prepared first. On a bulk silicon base 1 having a preferable thickness of $\leq 500$ μm, which is optionally lightly-doped bulk silicon about 1e15 cm$^{-3}$, a silicon dioxide layer 2 having a preferable thickness of $\leq 2$ μm is formed preferably by thermal oxidation at a temperature between 800° C. and 1000° C. On top of the silicon dioxide layer 2 a heavily doped silicon epi-layer, p-type, 1e19–1e20 cm$^{-3}$ 3 is preferably provided having a preferable thickness of 10 μm to 20 μm, as shown in FIGS. 1a and 1b.

Figure 2A:
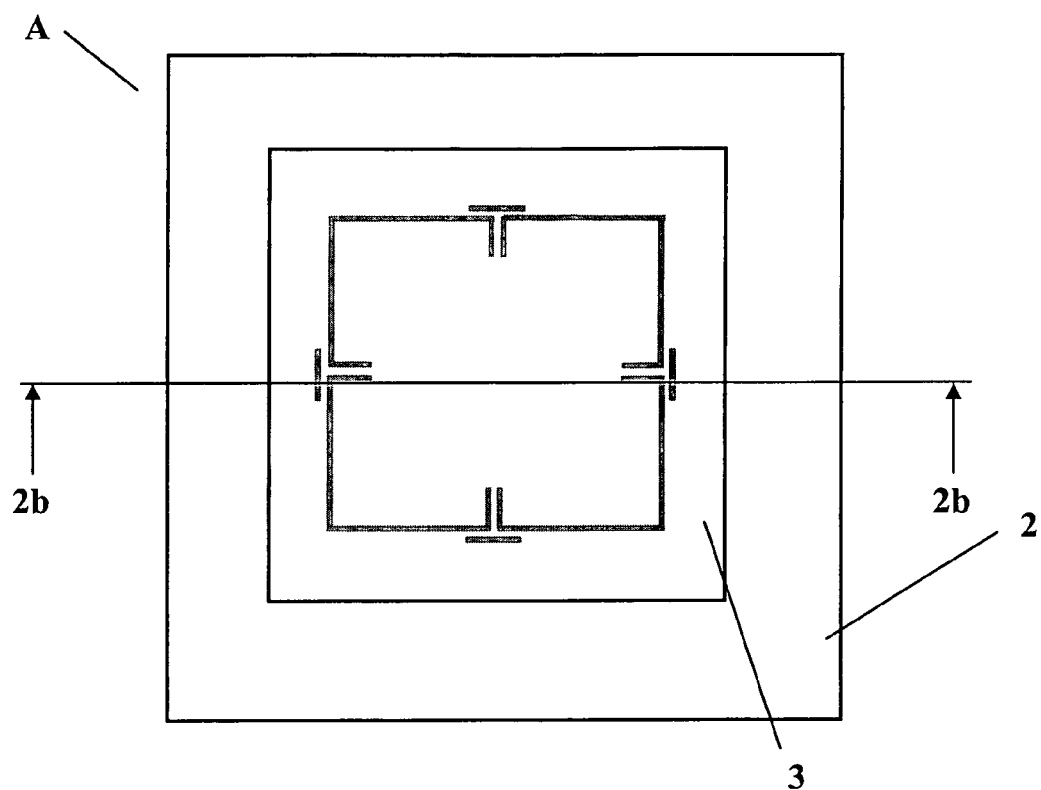
FIG. 2a is a top plan view of the preferred starting material of a resonator SOI wafer A and FIG. 2b is a cross-sectional view through wafer A of FIG. 2a at line 2b—2b of the resonator SOI wafer A.
Figure 2B:
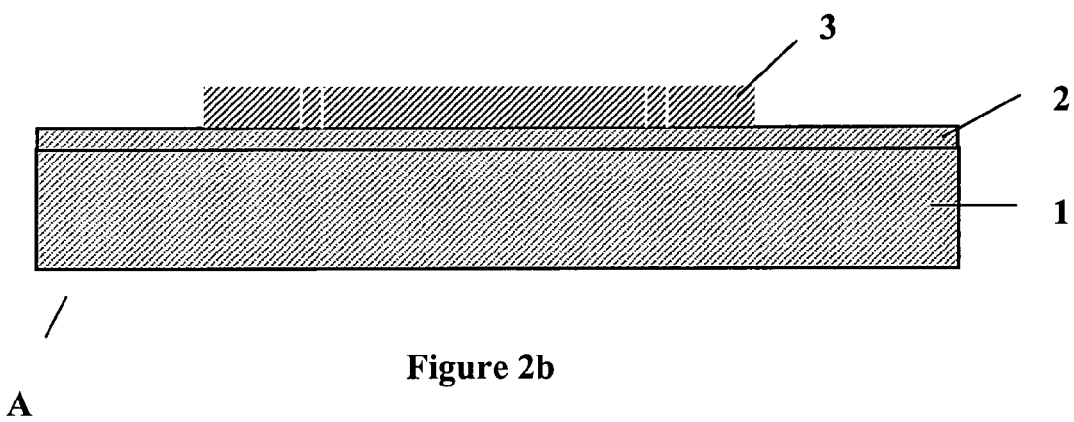

Then the cloverleaf petal and spring of the resonator wafer A is prepared. Parts of the heavily-doped silicon epi-layer 3 are removed, preferably by photoresist lithography, deep reactive ion etching (DRIE) and photoresist removal, as shown in FIGS. 2a and 2b. Photoresist lithography and DRIE are described in inter alia Veljko Milanovic et al. "Deep Reactive Ion Etching for Lateral Field Emission Devices", IEEE Electron Device Letters, Vol. 21, No. 6, June 2000, which is incorporated herein by reference.

The process preferably comprises:
1. The top silicon layer of the wafer is coated with a layer of photoresist.
2. Light from an illuminator is projected through a mask that contains the pattern to be created on the wafer. The light patterns that pass through the mask are projected onto the photoresist-coated layer.
3. The photoresist that is exposed to the light becomes soluble and is rinsed away, leaving miniature images of the mask pattern. It remains as an etch mask on the silicon surface of the wafer.
4. Regions unprotected by photoresist are etched preferably by gases utilizing Deep Reactive Ion Etching (DRIE). DRIE involves repeated exposure of a photoresist-masked silicon wafer to an etchant (usually $SF_6$) plasma in alternation with a passivant (usually $C_4F_8$) plasma. So the etching process preferably cycles between etching and deposition steps several times to achieve a deep etching with a quite vertical profile. The etch rate, profile and selectivity to the mask are controlled by adjusting etch and passivation efficiency or the time ratio of the two steps. Average etch rate is around 2.7 μm/min, and etching is terminated when the $SiO_2$ layer 2 is reached. The $SiO_2$ layer 2 serves as a stop layer.
5. After the DRIE process the photoresist is removed. Photoresist removal with solvents is a preferred process in the semiconductor manufacturing and is used extensively after any metal processing. Organic strippers may have any number of different components such as NMP, glycol ether, amine, and DMSO.

The process parameters for the photoresist lithography are preferably as follows:

a) Resist Application.
2.07 μm
AZI 1350J, 3500 RPM
100° C. Hotplate bake for 45 sec.
b) Resist Exposure
Photomask # C1
Time=7 sec.
Mask Offset=0.2 μm
c) Develop & Bake:
MF351:H$_2$O, 1:5 for 60 sec
100C Hotplate Bake for 45 sec.

Figure 3A:
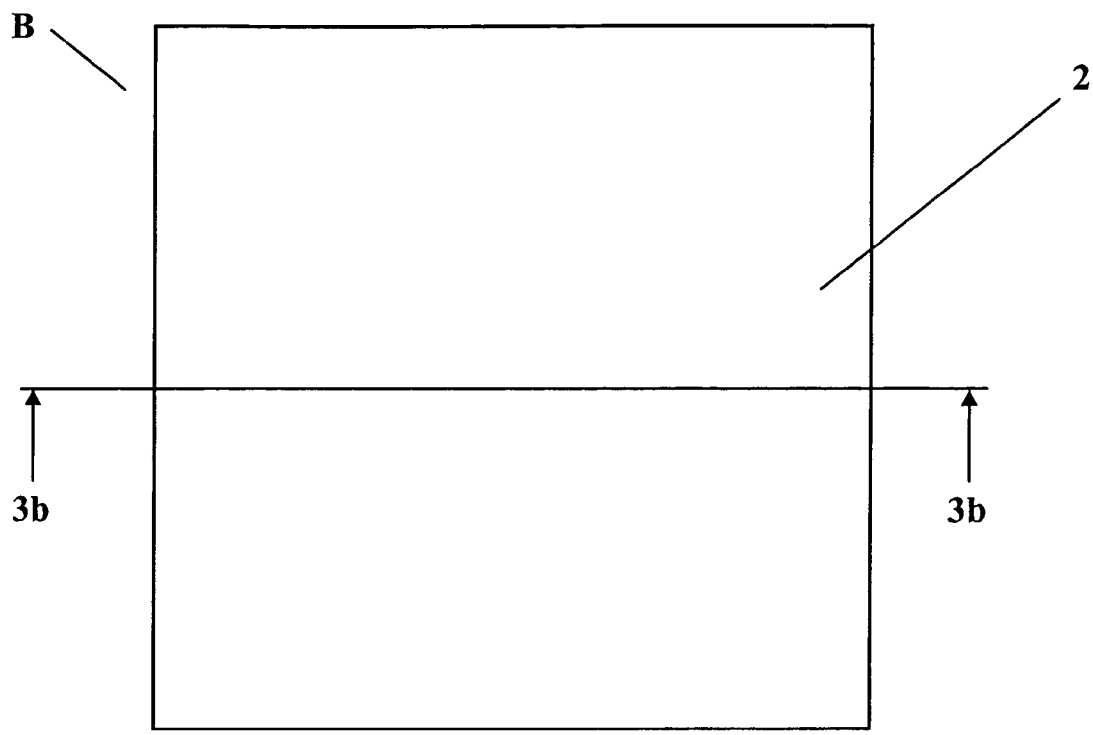
FIG. 3a is a top plan view of the preferred starting material of a resonator SOI wafer B and FIG. 3b is a cross-sectional view through wafer B of FIG. 3a at line 3b—3b of the bottom-portion wafer B.
Figure 3B:
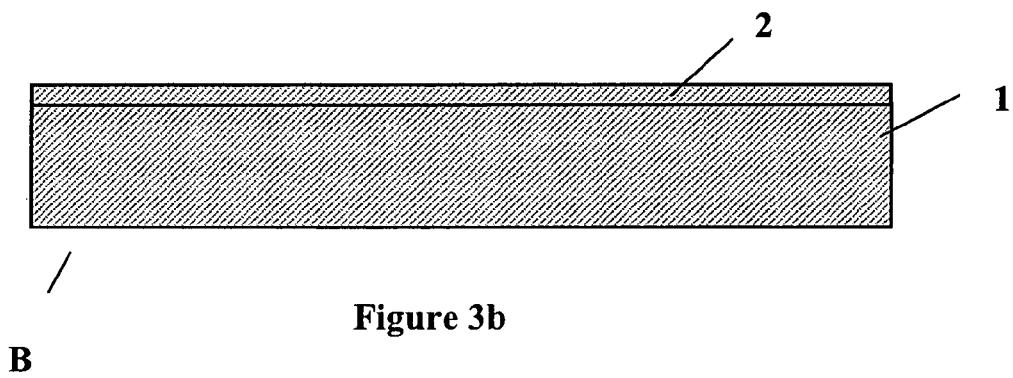

The bottom post wafer B is prepared next. On a bulk silicon base 1 having a preferable thickness of ≦500 μm, which is optionally lightly-doped bulk silicon layer (about 1e15 cm$^{-3}$) 2 a silicon dioxide layer, having a preferable thickness of ≦2 μm, is formed preferably by thermal oxidation between 800° C. and 1000° C. as shown in FIGS. 3a and 3b.

Figures 4A, 4B:
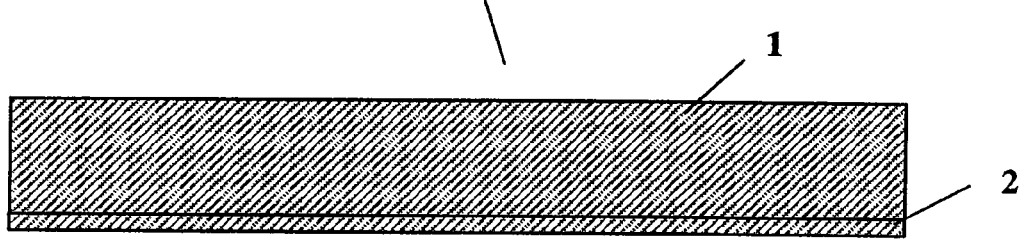
FIG. 4a is a cross-sectional view at line 3b—3b of the bond wafer B.
FIG. 4b is a cross-sectional view at line 2b—2b of bonded to wafer A.

Wafer B is bonded to resonator wafer A. The bondage between heavily-doped silicon epi-layer 3 of the bottom portion of wafer A and the silicon dioxide layer 2 of the wafer B may be achieved by heating to a temperature from 800° C. to 1000° C., as diagrammatically shown in FIGS. 4a and 4b. In this process the SiO$_2$ layer 2 of wafer B is preferably bonded to the heavily doped silicon epi-layer, 3 of the SOI wafer A. The epi-layer 3 is preferably p-type, 1e19–1e20 cm$^{-3}$.

Figure 5A:
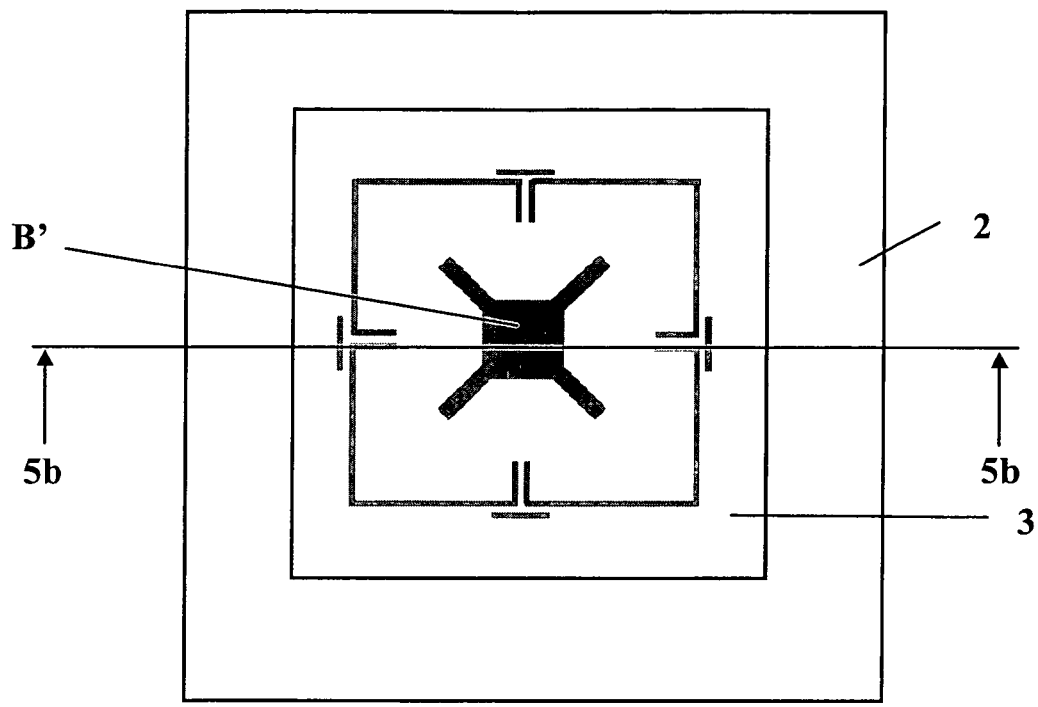
FIG. 5a is a top plan view of the resonator SOI wafer A and a bottom post B' and FIG. 5b is a cross-sectional view through wafer A and bottom post B' of FIG. 5a at line 5b—5b of the resonator SOI wafer A and bottom post B'.
Figure 5B:
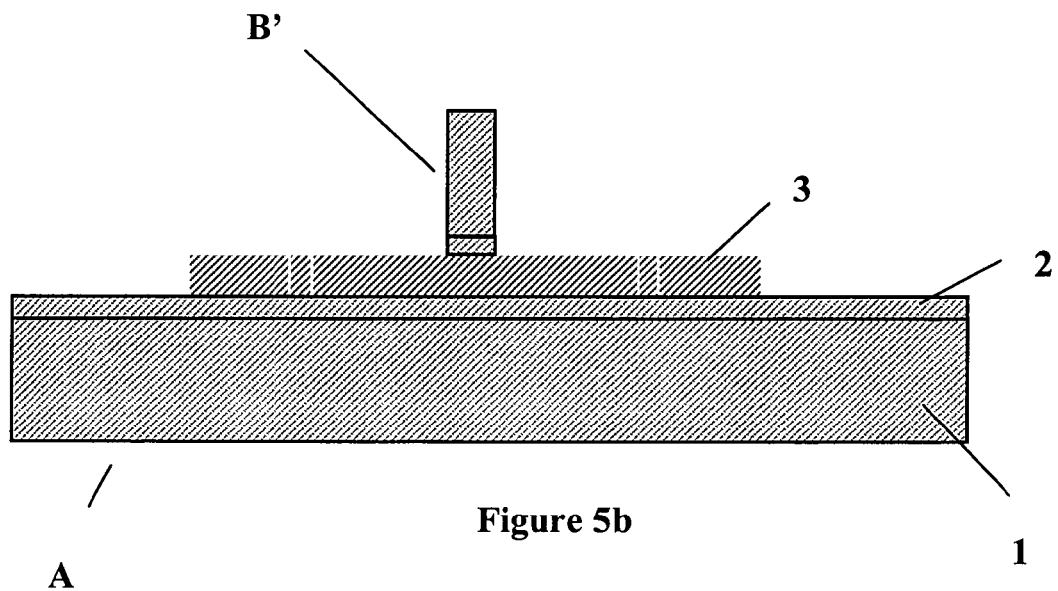

Then the bottom post B' and rib pattern are prepared. The bulk silicon layer 1 and silicon dioxide 2 of the wafer B have been partially removed to yield a post B' as shown in FIGS. 5a and 5b.

The process preferably comprises:
1. Coating the top silicon layer 1 of the wafer B with a layer of photoresist,
2. Projecting light from an illuminator through a mask that contains the pattern to be created on the wafer B,
3. Washing the exposed regions of the photoresist layer and leaving an etch mask on the silicon surface of the wafer B.
4. Etching silicon layer 1 unprotected by photoresist by gases utilizing the deep reactive ion etch (DRIE).
5. Removing SiO$_2$ layer 2 of wafer B by CF$_4$/O$_2$ plasma etch, and
6. Removing photoresist on the surface of the post B'.

Figure 6A:
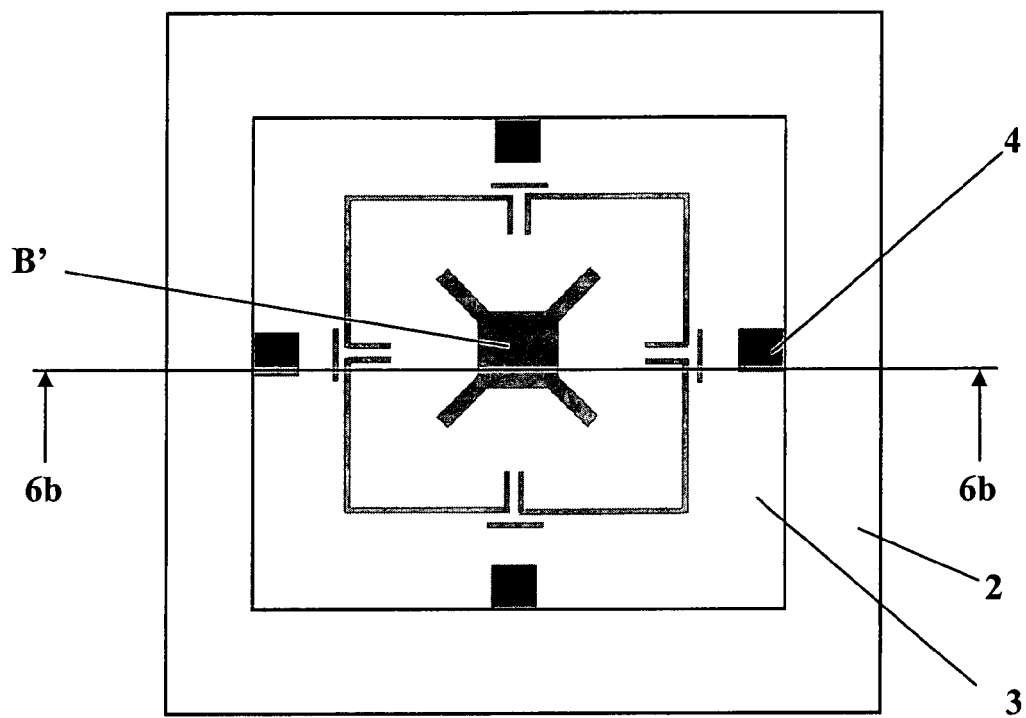
FIG. 6a is a top plan view of the resonator SOI wafer A and a bottom post B' and FIG. 6b is a cross-sectional view through wafer A and bottom post B' of FIG. 6a at line 6b—6b of the resonator SOI wafer A and bottom post B' after several contacts are attached to it.
Figure 6B:
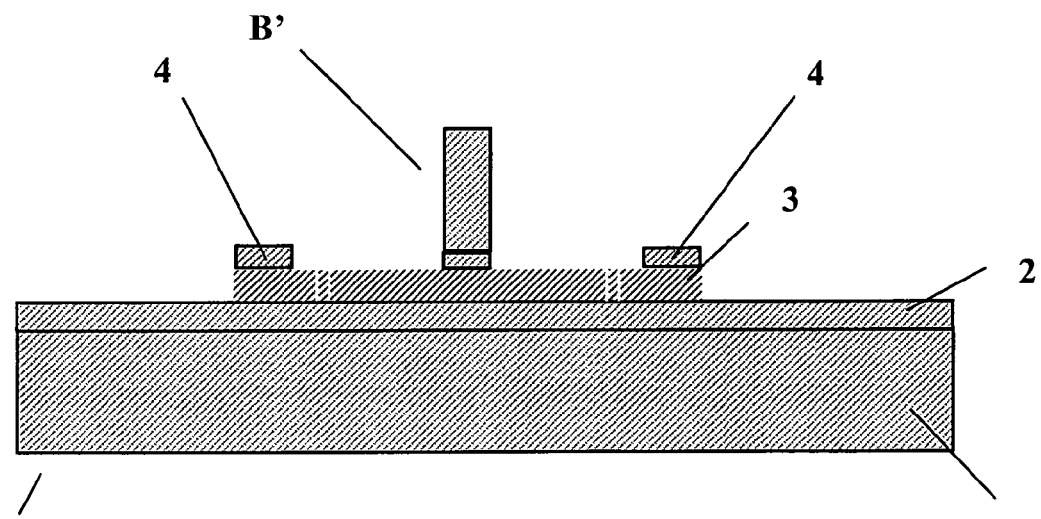

Then ohmic contacts are formed. On the heavily doped silicon epi-layer 3 several contacts 4 are preferably formed by sputtering metal. The contacts 4 are placed preferably symmetrically around the post B'. The contacts 4 contain preferably Ti/Pd/Au, Ti/Pt/Au or mixtures thereof. The contacts 4 are prepared, for example, by photoresist lithography, wet etching the metal and removing the photoresist (photoresist spray lithography, metallization Ti/Pt/Au and metal lift-off), as shown in FIGS. 6a and 6b. Metal liftoff is a common means of creating narrow metal lines for metals. A metal liftoff process is preferably done in a spray system. The process including resist photoresist, spray lithography, metallization and metal lift-off is described for example, in inter alia, in Andrea Via et al. "Metal Lift-off on InP HBTs Using Carbon Dioxide Snow Spray" (see: www1.boc.com/eco-snow/pdf/CS-MAX%202002.pdf.)

The process preferably comprises:
1. Coating the heavily doped silicon epi-layer, p-type, 1e19–1e20 cm$^{-3}$ 3 of the wafer A by metallization with sputter metal (Ti/Pd/Au).
2. Coating metal (Ti/Pd/Au) on the layer 3 with a layer of photoresist,
3. Projecting light from an illuminator through a mask that contains the pattern, namely the places for the ohmic contacts 4 to be created, on the layer 3 of wafer A,
4. Washing the exposed regions of the photoresist layer and leaving an etch mask on the silicon surface of the wafer A,
   Removing the metal which is not covered by photoresist by wet etch,
5. Removing photoresist on the surface of the ohmic contacts 4.

The process for photoresist spray lithography, metallization Ti/Pt/Au and metal lift-off preferably comprises:
1. Coating layer 3 with a layer of photoresist,
2. Projecting light from an illuminator through a mask that contains the pattern, namely the places for the ohmic contacts Ti/Pt/Au 4 to be created, on the layer on the layer 3 of wafer A,
3. Washing the exposed regions of the photoresist layer and leaving an etch mask on the silicon surface of the wafer A,
   Removing the metal which is not covered by photoresist by wet etch,
4. Depositing Ti/Pt/Au 4 by spray lithography,
5. Removing Ti/Pt/Au 4 covering the photoresist by a metal lift-off process,
6. Stripping the remaining photoresist yielding an Ti/Pt/Au 4 pattern on the surface of wafer C.

Figure 7A:
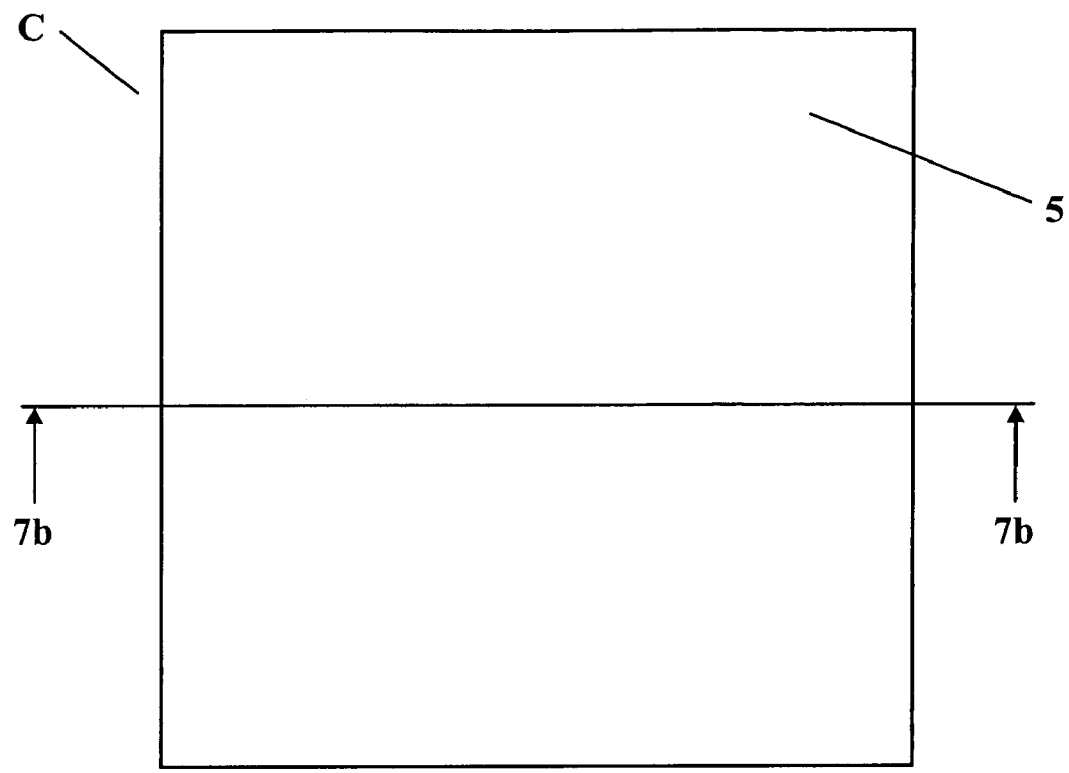
FIG. 7a is a top plan view of the preferred starting material of a base wafer C and FIG. 7b is a cross-sectional view through wafer C of FIG. 7a at line 7b—7b of the base wafer C.
Figure 7B:
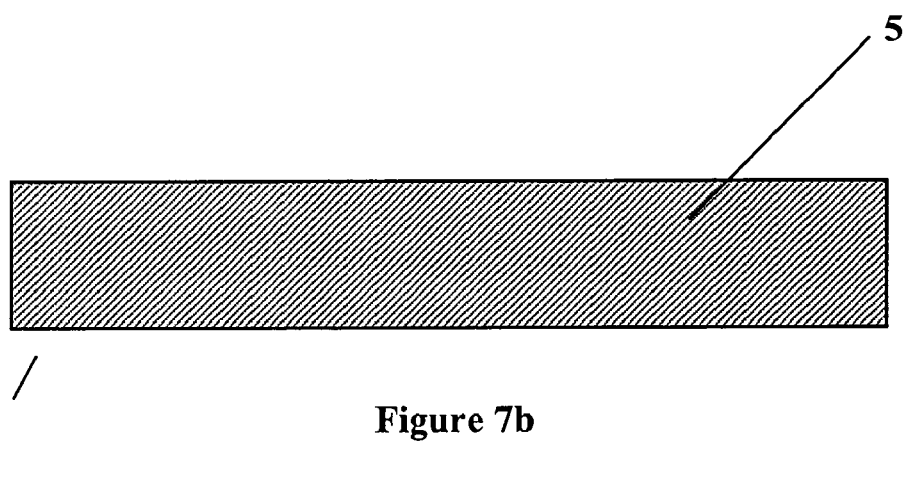

Then a base wafer C is prepared. The preferred starting material 5 of the base wafer C has a preferable thickness of about ≦800 μm and preferably contains a moderately doped silicon substrate p-type, 1e 19 cm$^{-3}$, as shown in FIGS. 7a and 7b.

Figure 8A:
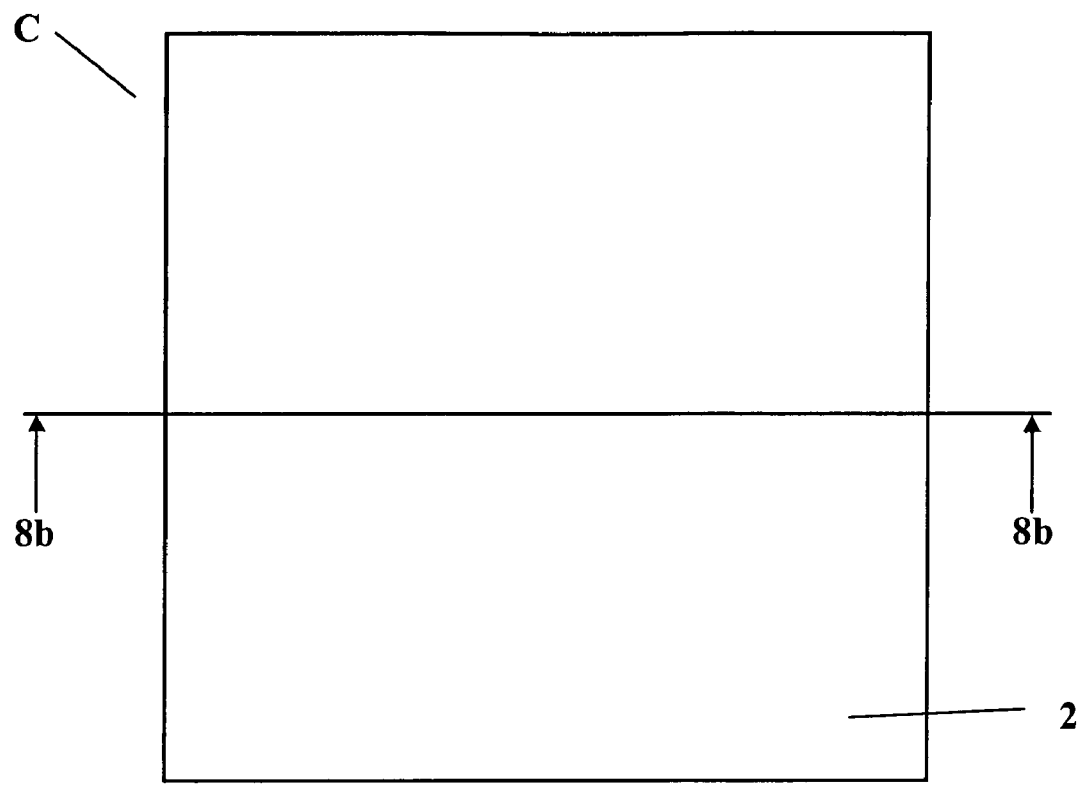
FIG. 8a is a top plan view of the preferred starting material of the base wafer C and FIG. 8b is a cross-sectional view through wafer C FIG. 8a at line 8b—8b of the base wafer C, after on both surfaces of base wafer C a silicon dioxide layer is grown.
Figure 8B:
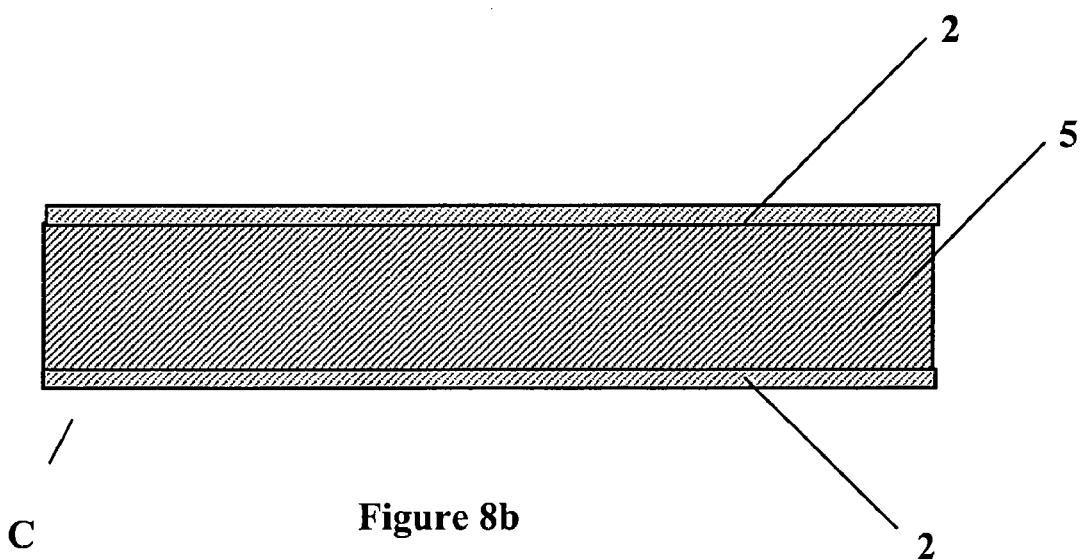

On both surfaces of the preferred starting material 5 of the base wafer C a silicon dioxide layer 2 of ≦0.3 μm-thick is provided, preferably by thermal oxidation at a temperature of about 950° C., as shown in FIGS. 8a and 8b.

Figure 9A:
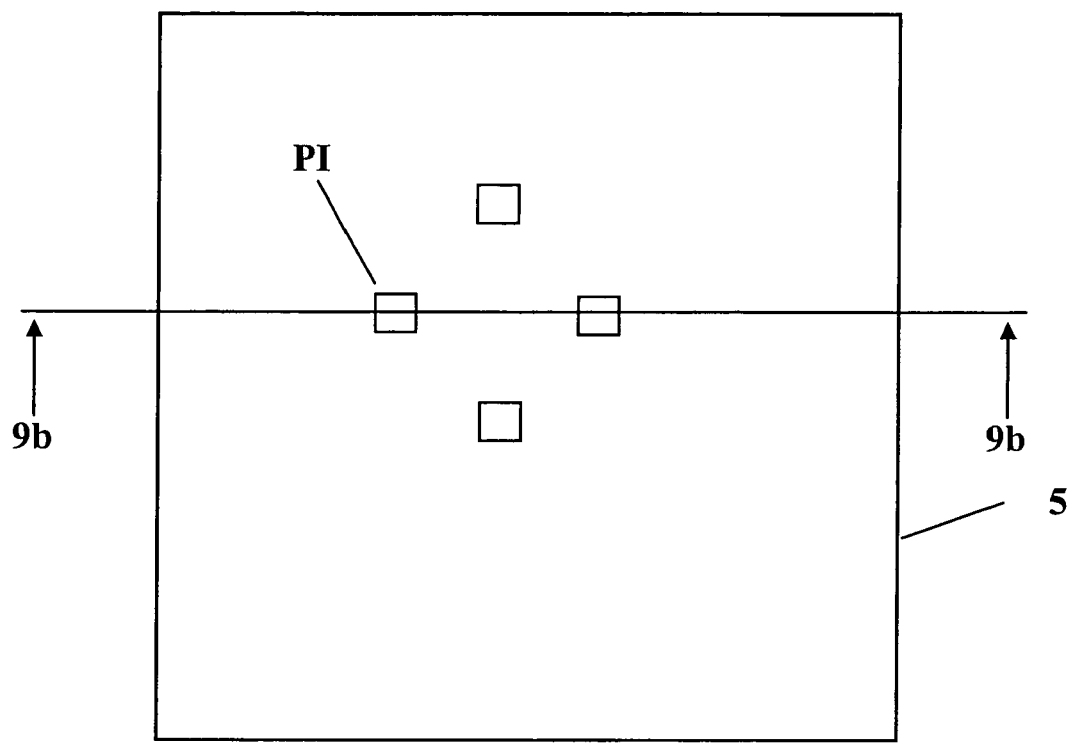
FIG. 9a is a top plan view of the preferred starting material of the base wafer C and FIG. 9b is a cross-sectional view through wafer C of FIG. 9a at line 9b—9b of the base wafer C, after pillar fabrication.
Figure 9B:
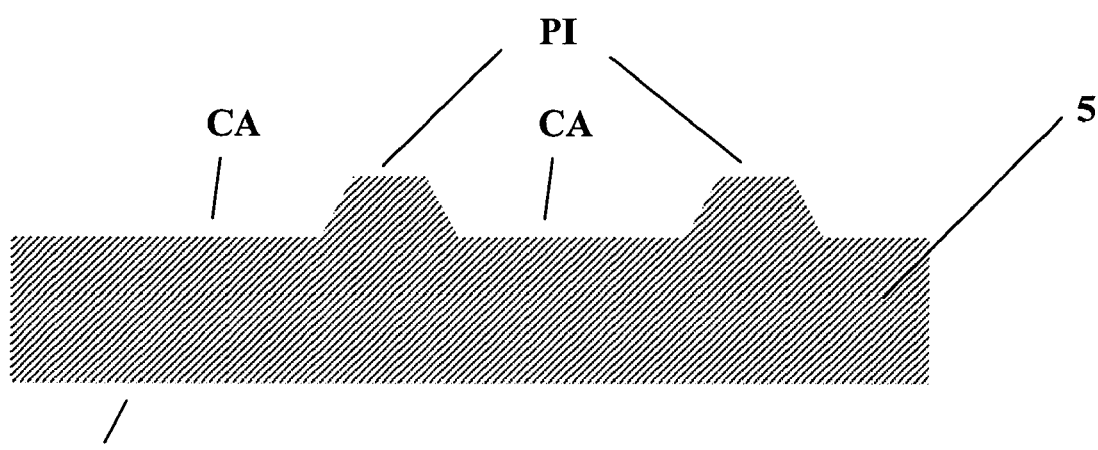

Then a pillar fabrication is carried out. From the preferred starting silicon material 5 a thickness of preferably about 5 μm to 8 μm is removed by photoresist lithography, wet etch SiO$_2$ and photoresist removal, wet KOH etch of silicon and SiO$_2$ removal in order to form pillars PI, as shown in FIGS. 9a and 9b.

The process preferably comprises:
1. Coating the top and bottom SiO$_2$ layer 2 of wafer C with a layer of photoresist,
2. Projecting light from an illuminator through a mask that contains the pattern, namely the places for the pillars PI to be created, on the top layer 2 of wafer C,
3. Washing the exposed regions of the photoresist layer and leaving an etch mask on the SiO$_2$ layer 2 of the wafer C,
4. Removing the SiO$_2$ layer 2, which is not covered by photoresist, by CF$_4$/O$_2$ plasma etch,
5. Removing 5–8 μm of moderate doped Si preferred starting material 5 by wet KOH etch to produce a cavity CA,
6. Removing remaining photoresist, and
7. Removing SiO$_2$ layer 2 on the pillars and on the bottom layer by CF$_4$/O$_2$ plasma etch.

Figure 10A:
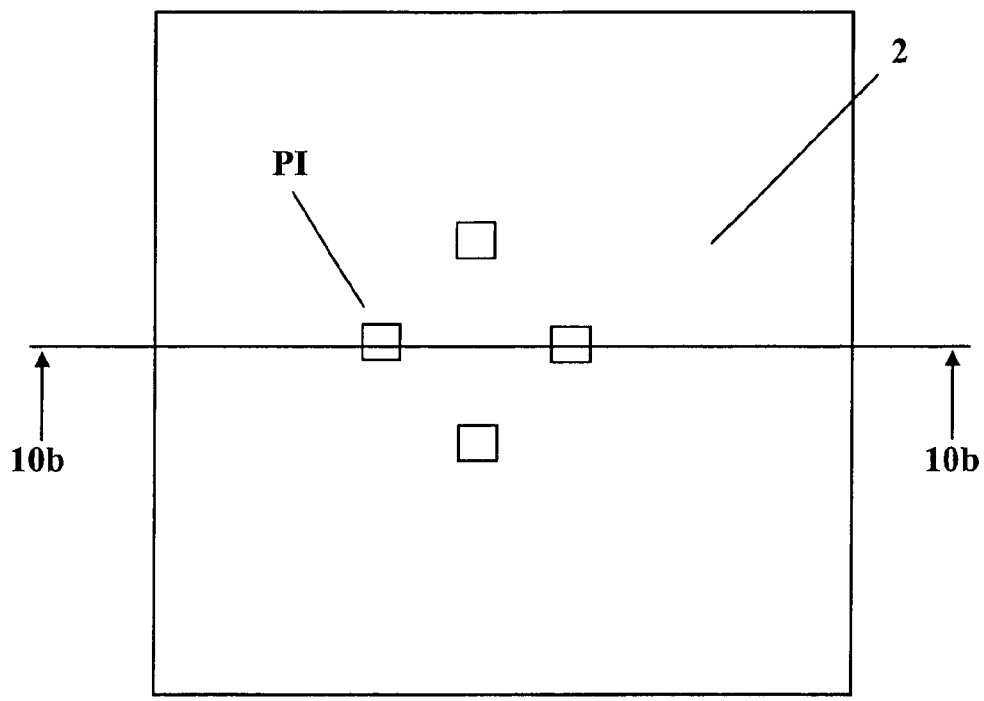
FIG. 10a is a top plan view of the preferred starting material of the base wafer C and FIG. 10b is a cross-sectional view through wafer C of FIG. 10a at line 10b—10b of the base wafer C, after on both surfaces of base wafer C a silicon dioxide layer is grown.
Figure 10B:
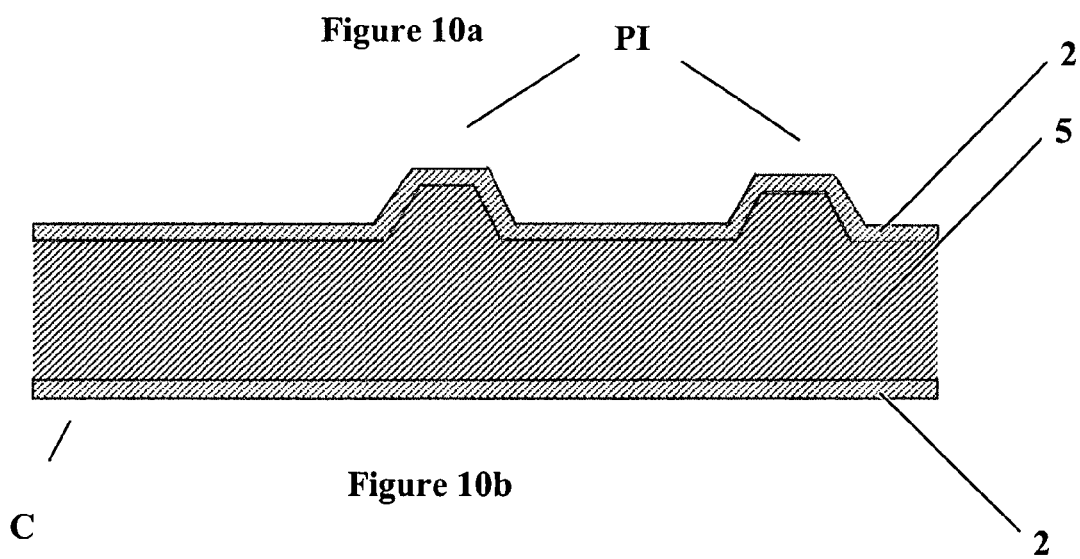

On both surfaces of the preferred starting material 5 of the base wafer C (with pillars PI) a SiO$_2$ layer of ≦2 μm thick is provided, preferably by thermal oxidation at a temperature of about 1050° C., as shown in FIGS. 10a and 10b.

Figure 11A:
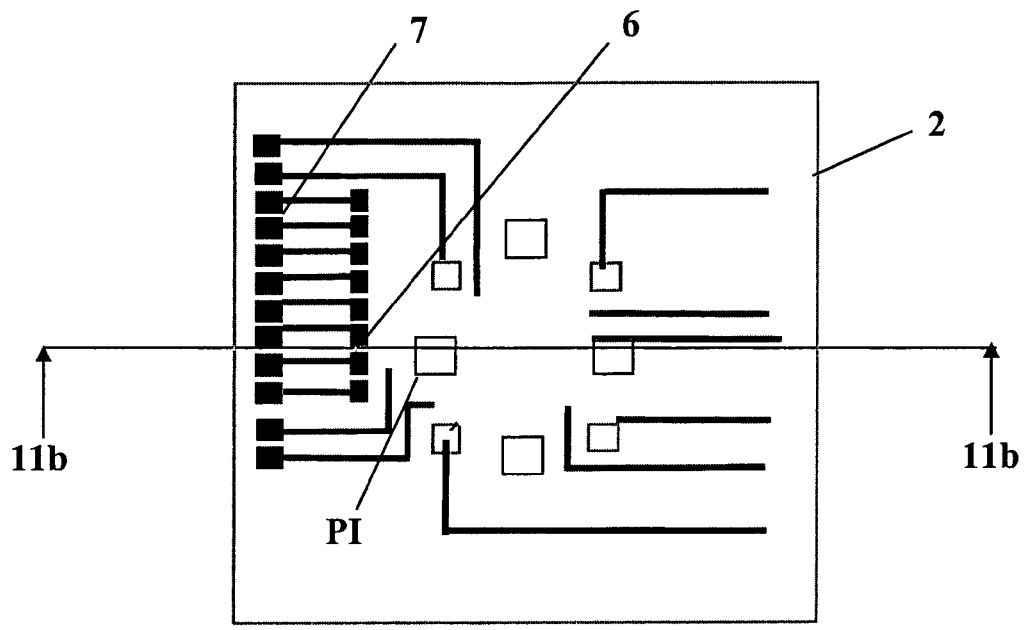
FIG. 11a is a top plan view of the preferred starting material of the base wafer C and FIG. 11b is a cross-sectional view through wafer C of FIG. 11a at line 11b—11b of the base wafer C after an ohmic contact and interconnect metal patterning.
Figure 11B:
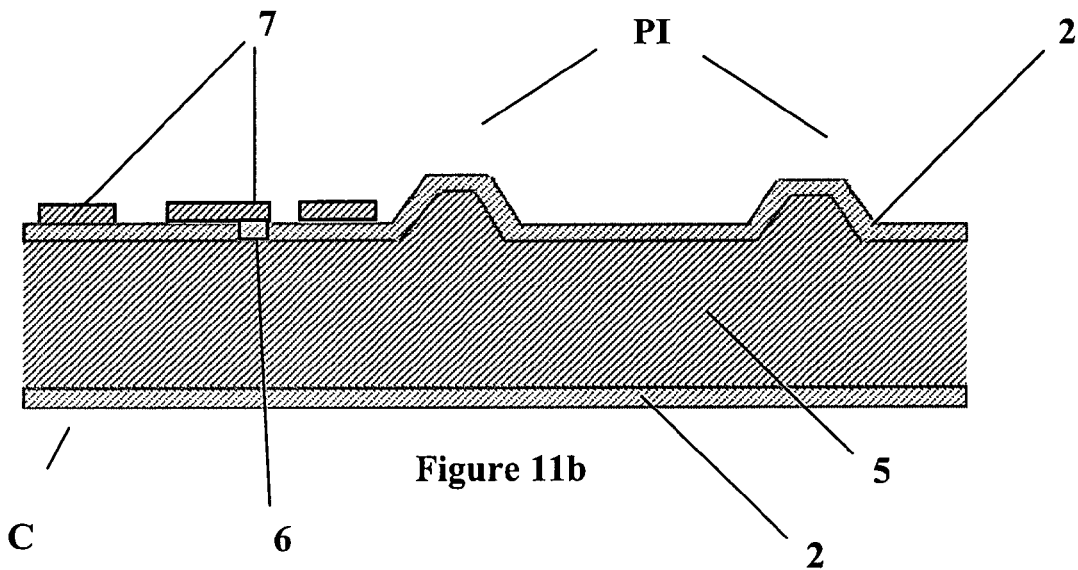

An ohmic contact metal Al 6 and interconnect metal Ti/Al 7 may be attached to the preferred starting material 5 of the base wafer C by photoresist spray lithography and metal deposition and liftoff, as shown in FIGS. 11a and 11b.

The process preferably comprises:
1. Coating $SiO_2$ layer 2 with a layer of photoresist,
2. Projecting light from an illuminator through a mask that contains the pattern, namely the places for the ohmic contact Al 6 to be created, on the layer 2 of wafer C,
3. Washing the exposed regions of the photoresist layer and leaving an etch mask on the $SiO_2$ layer 2 of the wafer C,
4. Removing the $SiO_2$ layer 2 by wet etch which is not covered by photoresist,
5. Depositing Al 6 by spray lithography,
6. Removing Al 6 covering the photoresist by a metal lift-off process,
7. Stripping the remaining photoresist yielding an Al 6 pattern on the to surface of wafer C,
8. Coating the top layer 2 of wafer C again with a layer of photoresist,
9. Projecting light from an illuminator through a mask that contains the pattern, namely the places for the interconnect metal Ti/Al 7 to be created, on the $SiO_2$ layer 2 of wafer C,
10. Depositing Ti/Al 7 by spray lithography,
11. Removing Ti/Al 7 covering the photoresist by a metal lift-off process,
12. Stripping remaining photoresist and yielding a Ti/Al 7 pattern on the wafer C.

Figure 12A:
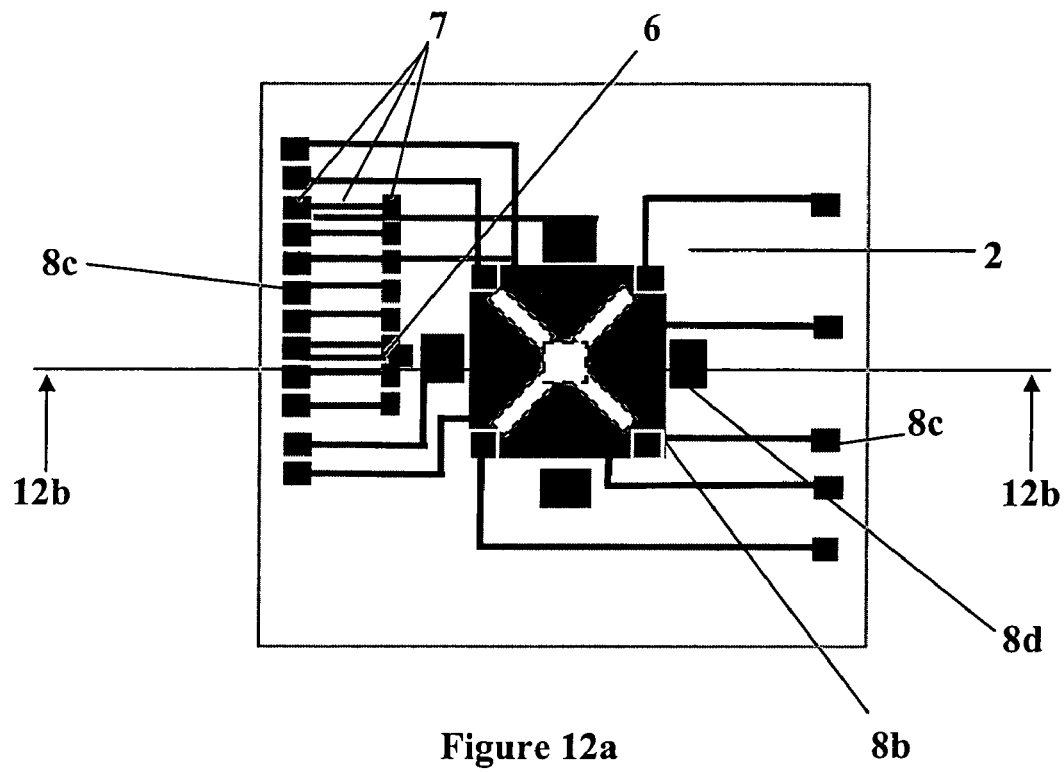
FIG. 12a is a top plan view of the preferred starting material of the base wafer C and FIG. 12b is a cross-sectional view through wafer C of FIG. 12a at line 12b—12b of the base wafer C after electrode, bond pad, and wire bond metal were provided on the base wafer C.
Figure 12B:
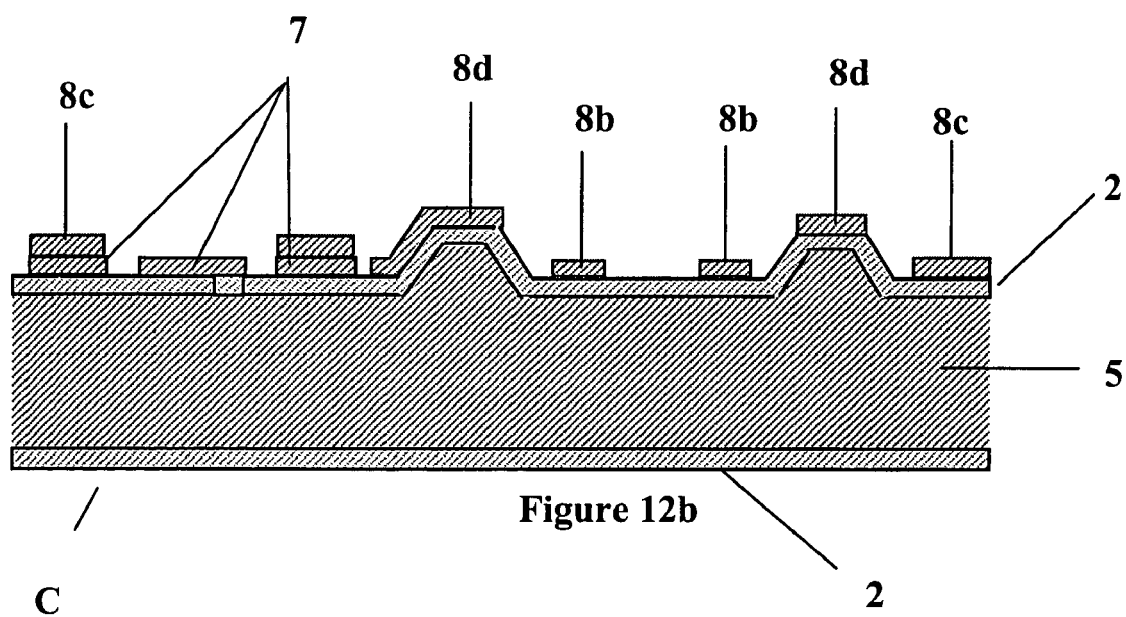

Electrode metal (drive/sense electrodes) Ti/Pt/Au 8b, wire bond metal Ti/Pt/Au 8c, and wafer bonding metal Ti/Pt/Au 8d may be provided by photoresist lithography and metal deposition and liftoff, as shown in FIGS. 12a and 12b.

The process preferably comprises:
1. Coating the top surface of wafer C with a layer of photoresist,
2. Projecting light from an illuminator through a mask that contains the pattern, namely the places for the wire bond metal Ti/Pt/Au 8 to be created, on the top surface of wafer C,
3. Washing the exposed regions of the photoresist layer and leaving a mask on the top surface of the wafer C,
4. Depositing Ti/PT/Au 8 on the surface of wafer C by spray lithography,
5. Removing excess Ti/PT/Au 8 covering the photoresist by a metal lift-off process,
6. Stripping remaining photoresist yielding a wire bond Ti/Pt/Au 8.

Figure 13A:
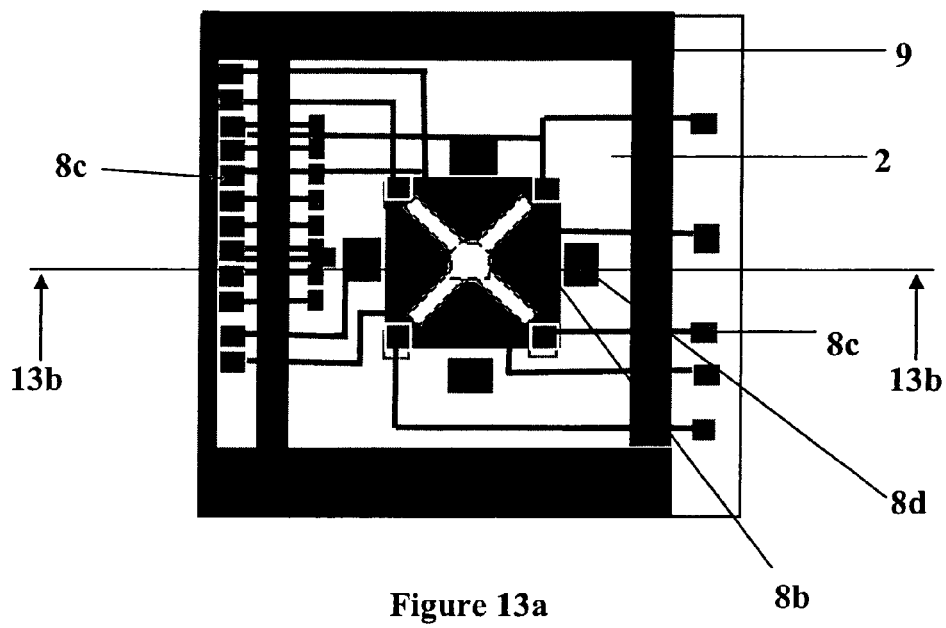
FIG. 13a is a top plan view of the preferred starting material of the base wafer C and FIG. 13b is a cross-sectional view through wafer C of FIG. 13a at line 13b—13b of the base wafer C after silicon nitride is provided on the base wafer C.
Figure 13B:
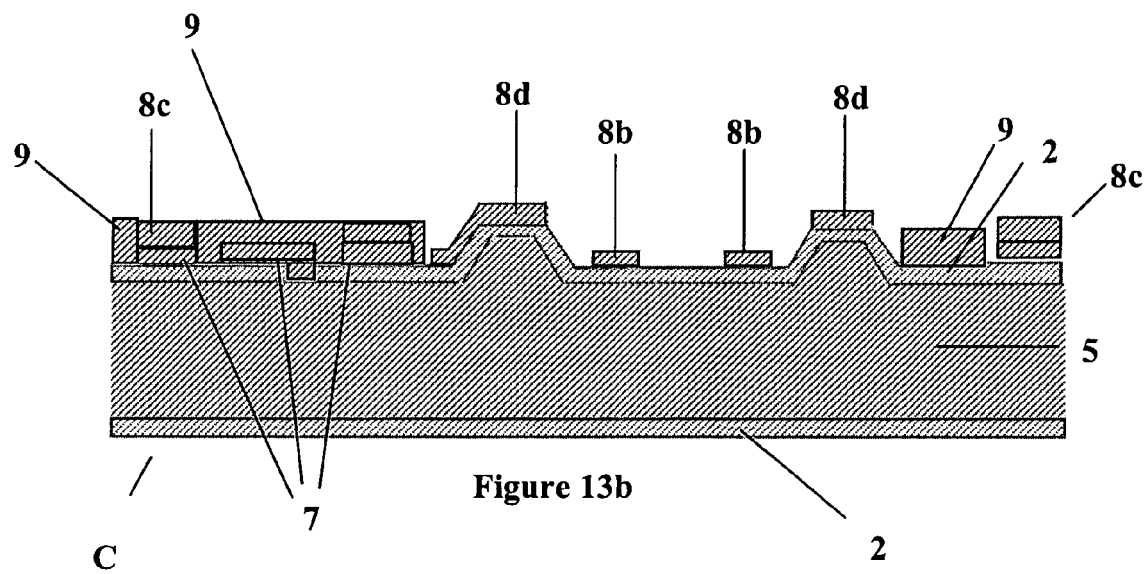

A $Si_3N_4$ nitride 9 layer is preferably provided on the top of base wafer C by dielectric layer deposition and patterning. A $Si_3N_4$ layer 9 ≦ 0.5 μm thick is preferably provided by deposition and photoresist lithography and removed by $CF_4/O_2$ plasma etch of $Si_3N_4$ in device and wire bond regions and by photoresist removal, as shown in FIGS. 13a and 13b.

The process preferably comprises:
1. Coating the surface of wafer C with $Si_3N_4$ 9, with a thickness of about 0.5 μm,
2. Coating $Si_3N_4$ 9 with a layer of photoresist,
3. Projecting light from an illuminator through a mask that contains the pattern, namely covering the places for the interconnect metal dielectric layer $Si_3N_4$ 9 to be created, on the surface of wafer C,
4. Washing the exposed regions of the photoresist layer and leaving mask on $Si_3N_4$ 9,
5. Removing the $Si_3N_4$ 9 which is not covered by $CF_4/O_2$ plasma etch, and
6. Stripping remaining photoresist.

Figure 14A:
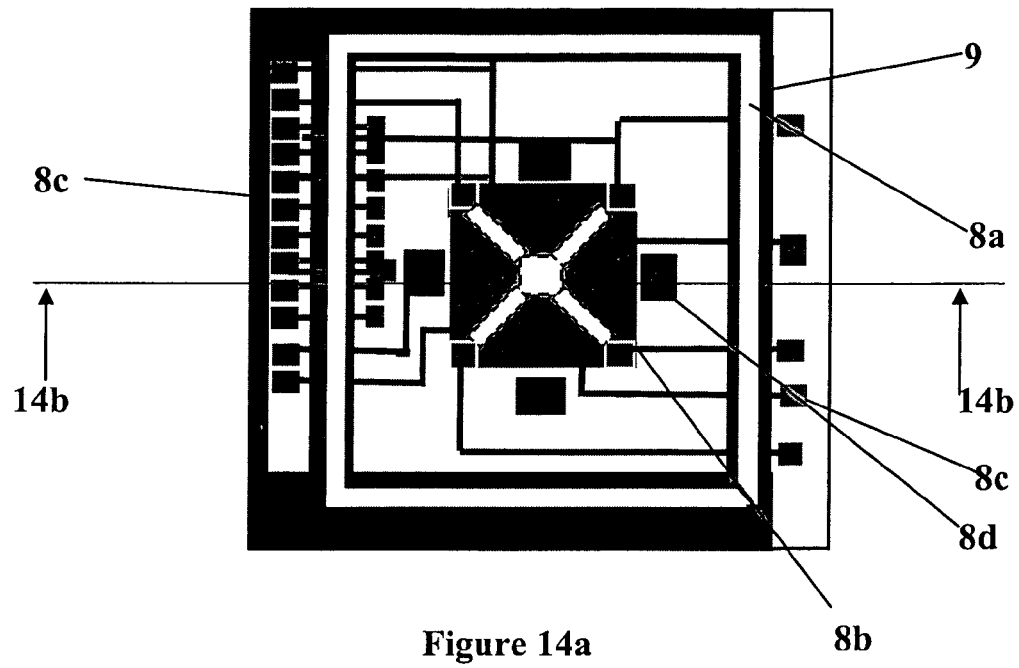
FIG. 14a is a top plan view of the preferred starting material of the base wafer C and FIG. 14b is a cross-sectional view through wafer C of FIG. 14a at line 14b—14b of the base wafer C after a seal ring deposition.
Figure 14B:
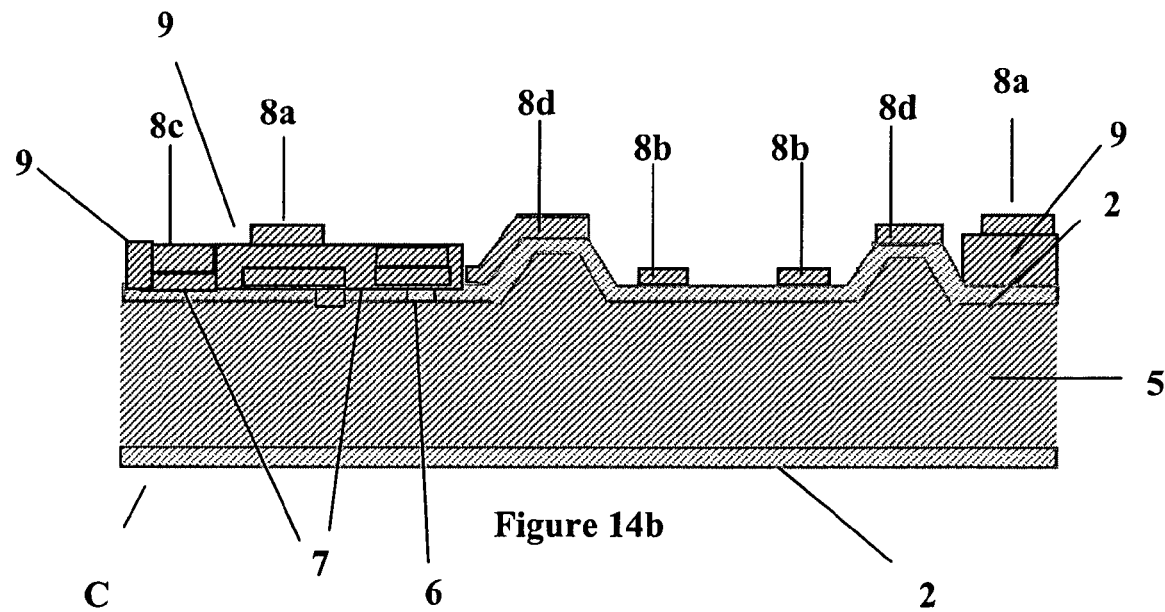

A seal ring 8a containing Ti/Pt/Au is provided on the silicon nitride 9 by metal patterning and deposition, particularly by photoresist lithography spray on thick resist and metal deposition and liftoff, as shown in FIGS. 14a and 14b.

The process preferably comprises:
1. Coating the top surface of wafer C with a layer of photoresist,
2. Projecting light from an illuminator through a mask that contains the pattern, namely the places for seal ring metal 8a containing Ti/Pt/Au provided on the silicon nitride 9 to be created, on the top surface of wafer C,
3. Washing the exposed regions of the photoresist layer and leaving a mask on the top surface of the wafer C,
4. Depositing Ti/Pt/Au on the surface of wafer C,
5. Removing excess Ti/Pt/Au 8a covering the photoresist by a metal lift-off process,
6. Stripping remaining photoresist yielding removing of excess Ti/Pt/Au 8a covering the photoresist by a metal lift-off process,
7. Stripping remaining photoresist yielding a seal ring 8a containing Ti/Pt/Au on the silicon nitride 9.

Figure 15A:
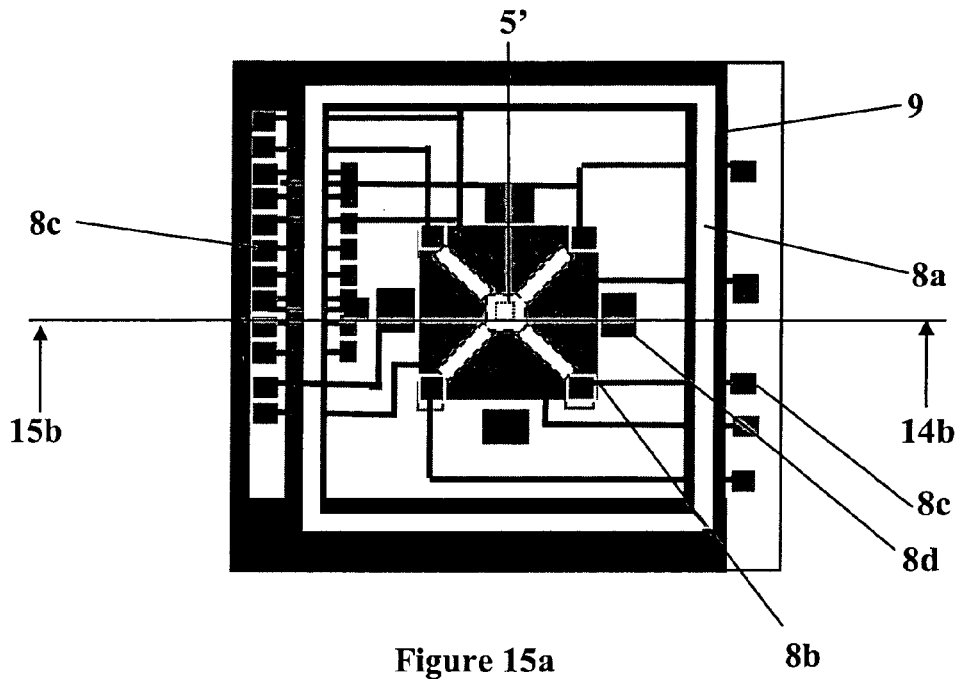
FIG. 15a is a top plan view of the preferred starting material of the base wafer C and FIG. 15b is a cross-sectional view through wafer C of FIG. 15a at line 15b—15b of the base wafer C after a post hole etch is carried out in the base wafer C.
Figure 15B:
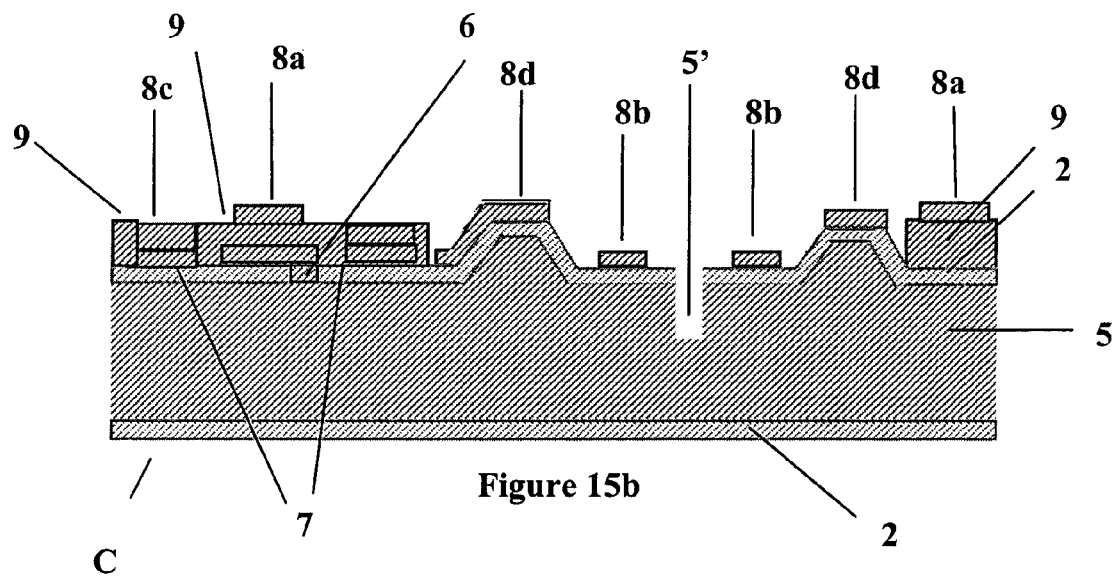

As a next step a post hole etch 5' is preferably carried out by photoresist lithography (spray on thick resist), $CF_4/O_2$ plasma etch of silicon dioxide in the hole region, DRIE of silicon hole and photoresist removal as shown in FIGS. 15a and 15b.

The process preferably comprises:
1. Coating the top surface of wafer C with a layer of photoresist,
2. Projecting light from an illuminator through a mask that contains the pattern, namely the place for the hole region, on the top surface of wafer C,
3. Washing the exposed regions of the photoresist layer and leaving a mask on the top surface of the wafer C,
4. $CF_4/O_2$ plasma etch of silicon dioxide in hole region,
5. DRIE remove to create a silicon hole, and
6. Stripping the remaining photoresist layer.

Figure 16A:
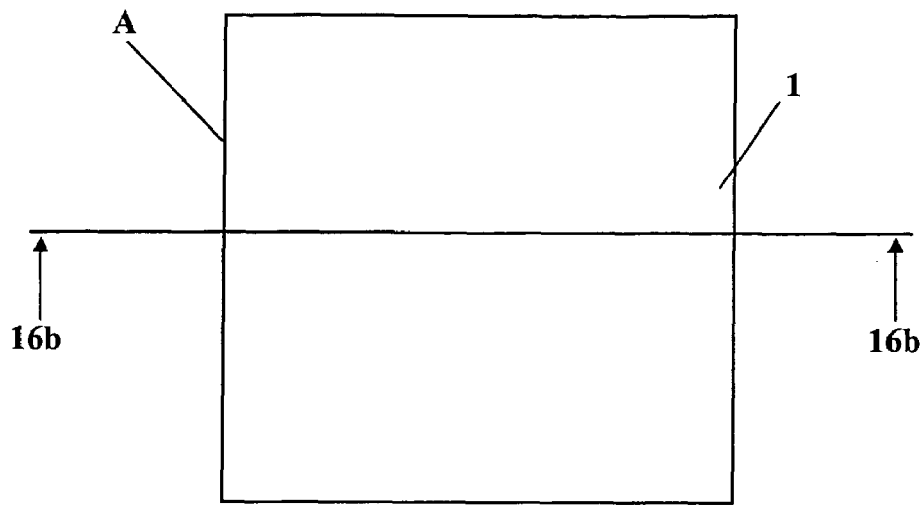
FIG. 16a is a top plan view of the preferred starting material of the bottom surface of wafer A and FIG. 16b is a cross-sectional view through the base wafer A, post B', and base wafer C of FIG. 16a at line 16b—16b of the base wafer A, post B', and base wafer C.
Figure 16B:
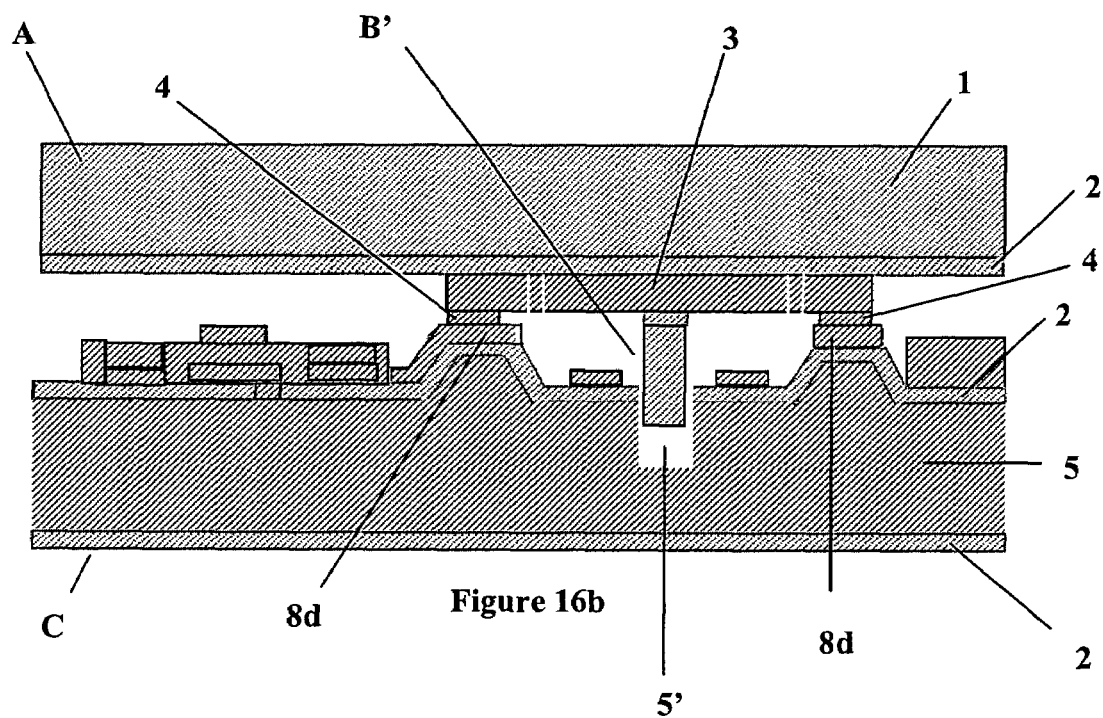

As a next step, a bonding of resonator wafer A according to FIG. 6b and to base wafer C according to FIG. 15b is carried out preferably by an Au to Au thermo compression bond at a temperature of 300° C. to 400° C., as shown in FIGS. 16a and 16b. The bonding is carried out between the contacts 4 of resonator wafer A-B and the seal ring metal 8a of the base wafer C. Post B' of resonator wafer A-B fits into the post hole 5' of base wafer C.

Figure 17A:
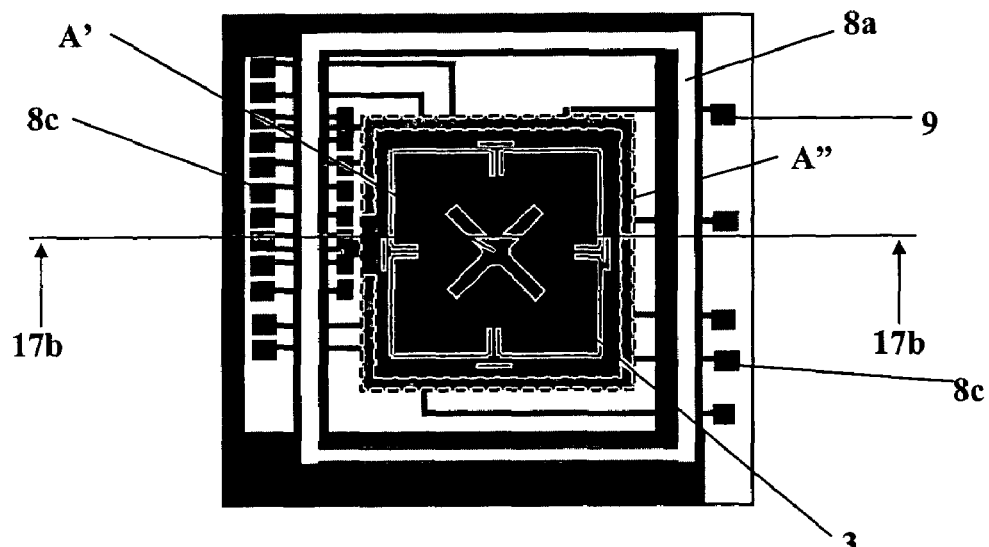
FIG. 17a is a top plan view depicting post A' and base wafer C and FIG. 17b is a cross-sectional view through the base wafer A, post B', and base wafer C of FIG. 17a at line 17b—17b depicting post A', post B', and base wafer C after post formation.
Figure 17B:
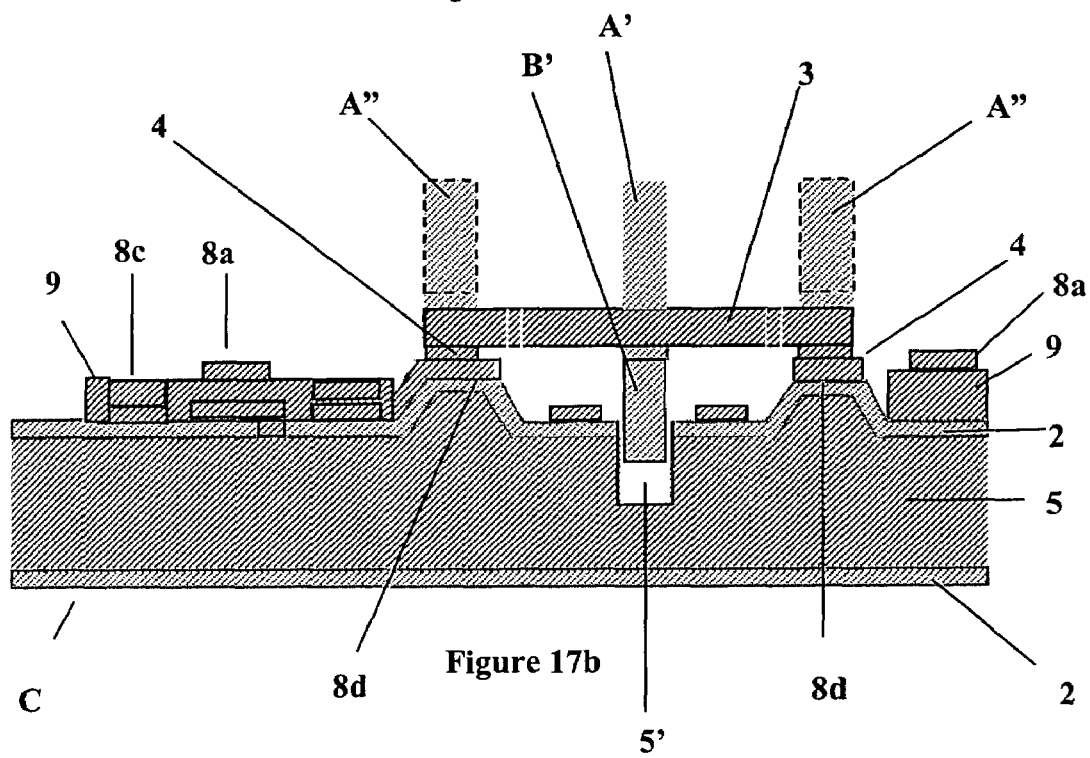

The post fabrication on wafer A is preferably carried out by photoresist lithography (spray on thick resist), $CF_4/O_2$ plasma etching of silicon dioxide, photoresist removal by dry etch. Thereby a post A' and optional frame formation in the top layer A" is obtained, as shown in FIGS. 17a and 17b.

The process preferably comprises:
1. Coating the top surface of wafer A with a layer of photoresist,
2. Projecting light from an illuminator through a mask that contains the pattern, namely the place for the hole region on the top surface of wafer A,
3. Washing the exposed regions of the photoresist layer and leaving a mask on the top surface of the wafer A,
4. DRIE remove of silicon from wafer A,
5. $CF_4/O_2$ plasma etch of silicon dioxide from wafer A, whereby a post A' and optional frame formation in the top layer A" is obtained, and 6. Stripping the remaining photoresist layer.

Figure 18A:
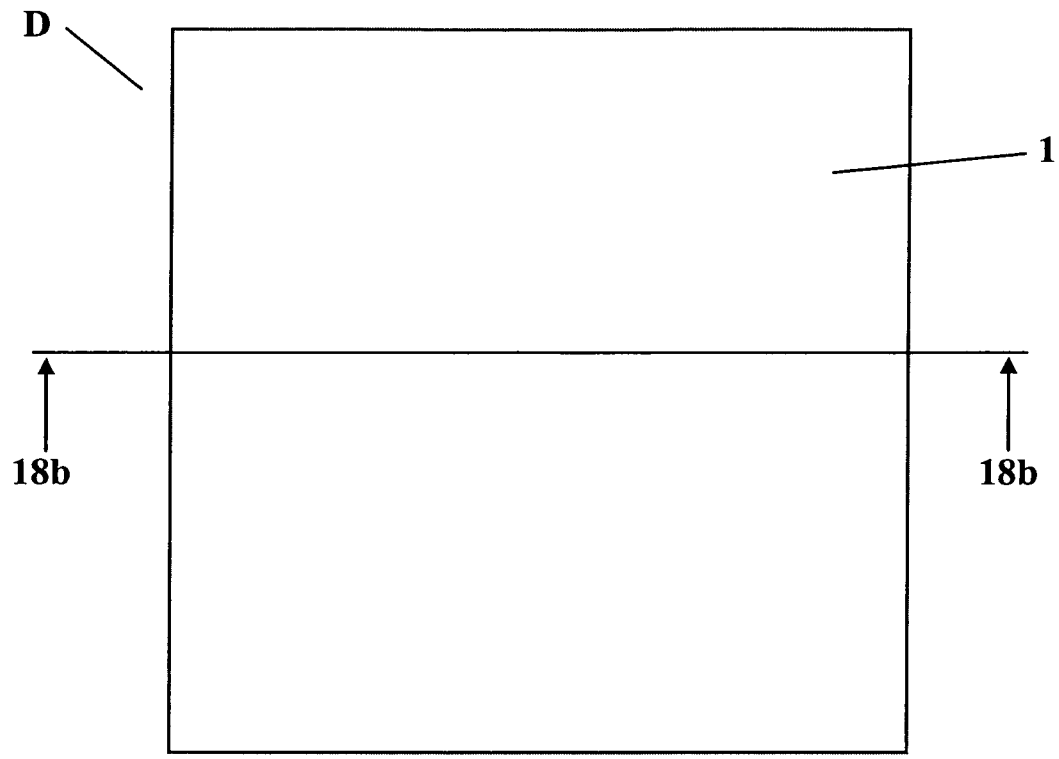
FIG. 18a is a bottom view of the preferred starting material of a cap wafer D and FIG. 18b is a cross-sectional view through the cap wafer D of FIG. 18a at line 18b—18b of the cap wafer D.
Figure 18B:
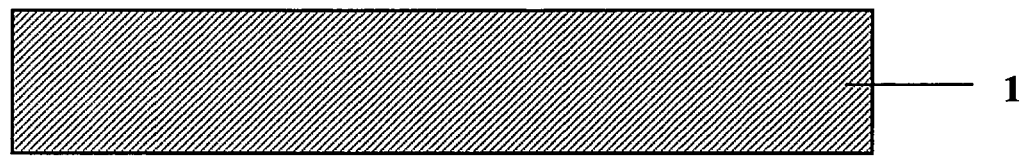

A cap wafer D is prepared with a preferred starting material of lightly doped bulk silicon 1 having a thickness of ≦800 µm and having on top and bottom a thin silicon dioxide layer 2, as shown in FIGS. 18a and 18b.

FIG. 19 to FIG. 24 show the preferred preparation of the cap, which has a backside metallization. The backside metallization is inside of the integrated all-Si capacitive microgyro after the cap wafer D is bonded to the base wafer C.

Figure 19A:
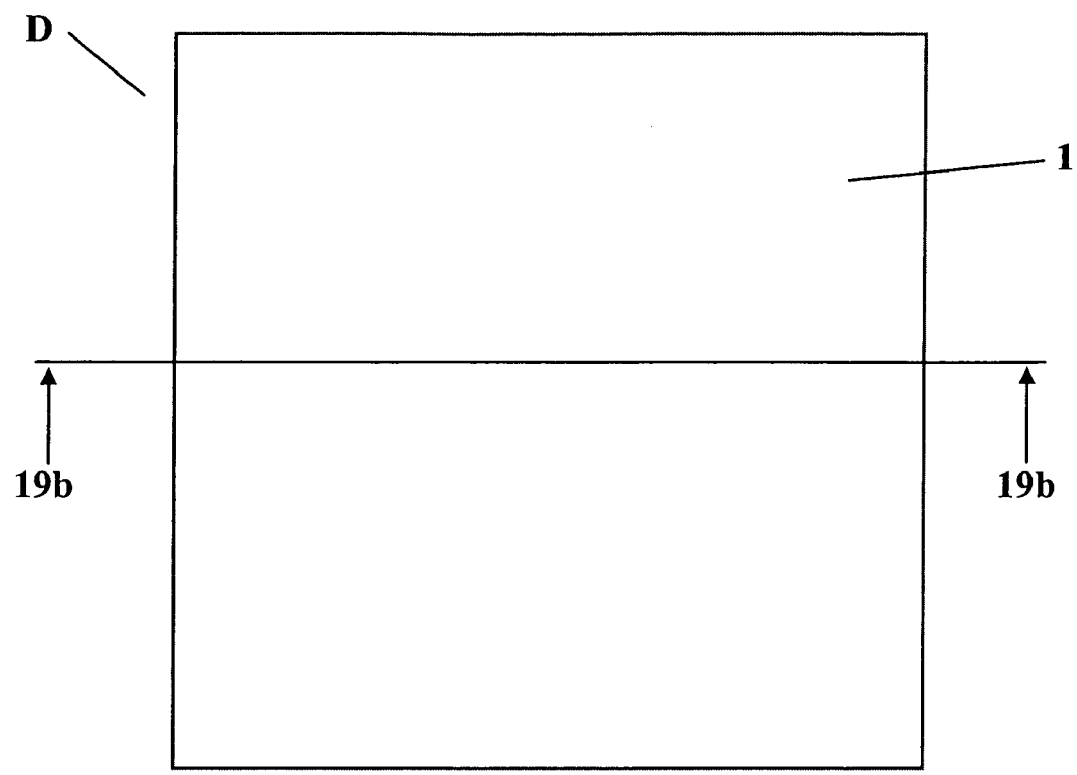
FIG. 19a is a bottom view of the preferred starting material of a cap wafer D and FIG. 19b is a cross-sectional view through the cap wafer D of FIG. 19a at line 19b—19b of the cap wafer D after preparing main cavity formation.
Figure 19B:
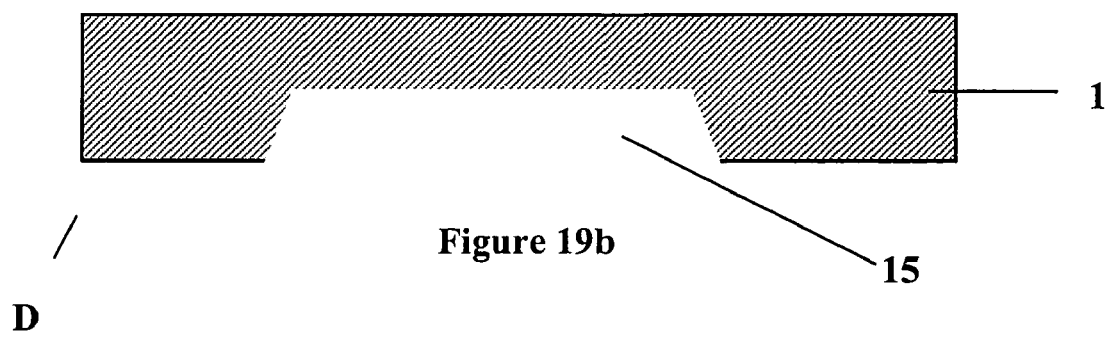

A main cavity 15 is preferably formed on the backside of the cap wafer D by photoresist lithography, DRIE and photoresist removal, as shown in FIGS. 19a and 19b.

The process preferably comprises:
1. Coating the bottom silicon 1 of wafer C with a layer of photoresist,
2. Projecting light from an illuminator through a mask that contains the pattern, namely the places for the cavity 15 to be created,
3. Washing the exposed regions of the photoresist layer and leaving an etch mask on the silicon 1 of the wafer C patterning the cavity 15,
4. Removing 25–35 µm of moderate doped Si preferred starting material 1 by DRIE to yield the cavity 15, and removing remaining photoresist.

Figure 20A:
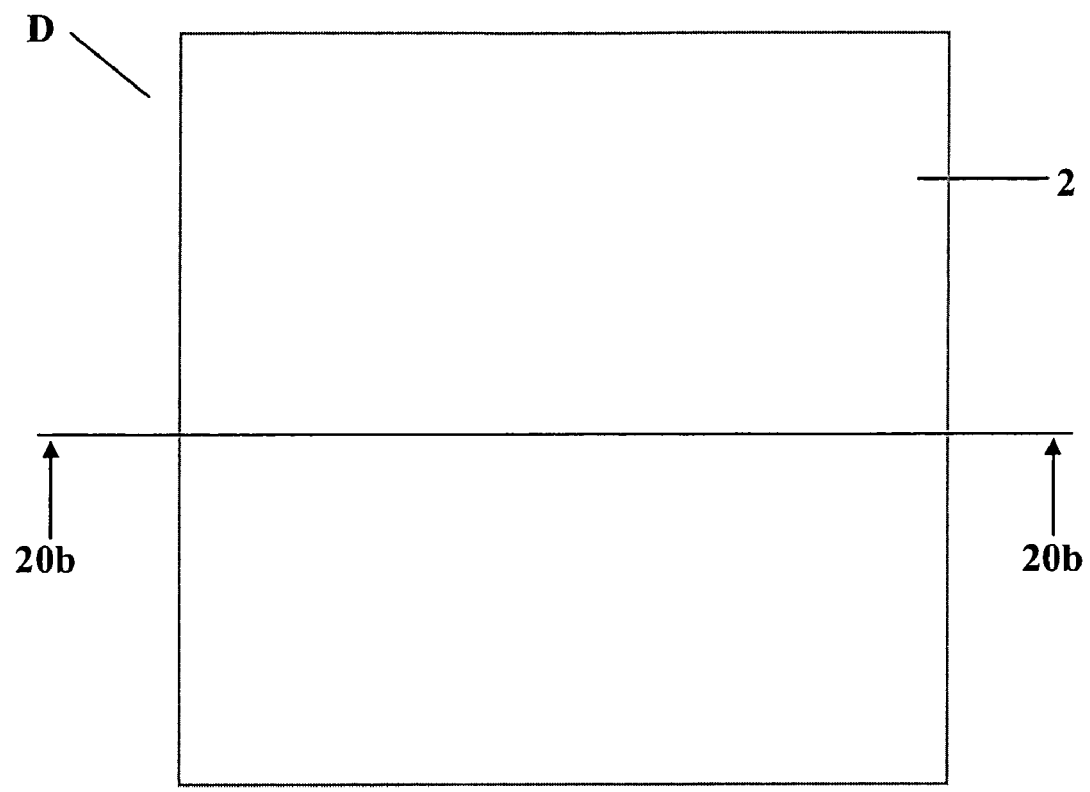
FIG. 20a is a bottom plan view of the preferred starting material of a cap wafer D and FIG. 20b is a cross-sectional view through the cap wafer D of FIG. 20a at line 20b—20b of the cap wafer D thermal oxidation.
Figure 20B:
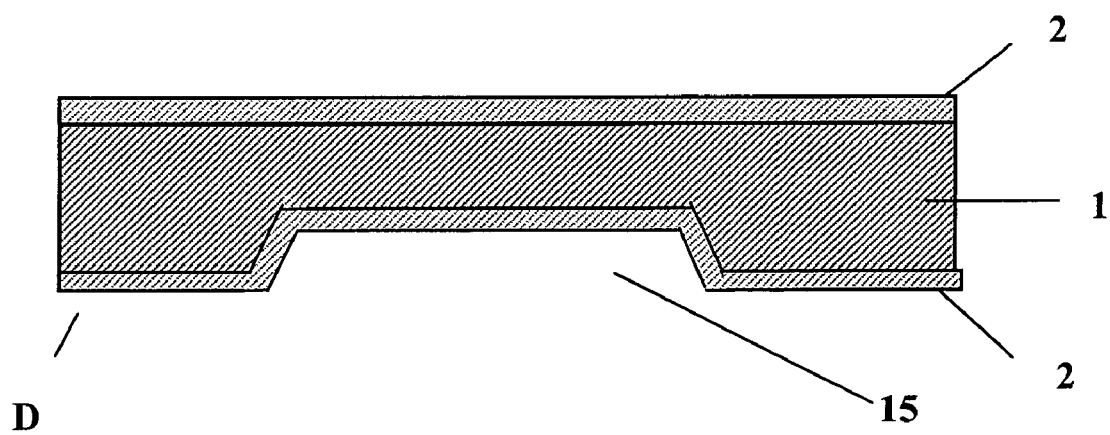

The cap wafer D is preferably treated by 1050° C. in a furnace yielding a $SiO_2$ layer 2 on the top and bottom side of the silicon 1, as shown in FIGS. 20a and 20b.

Figure 21A:
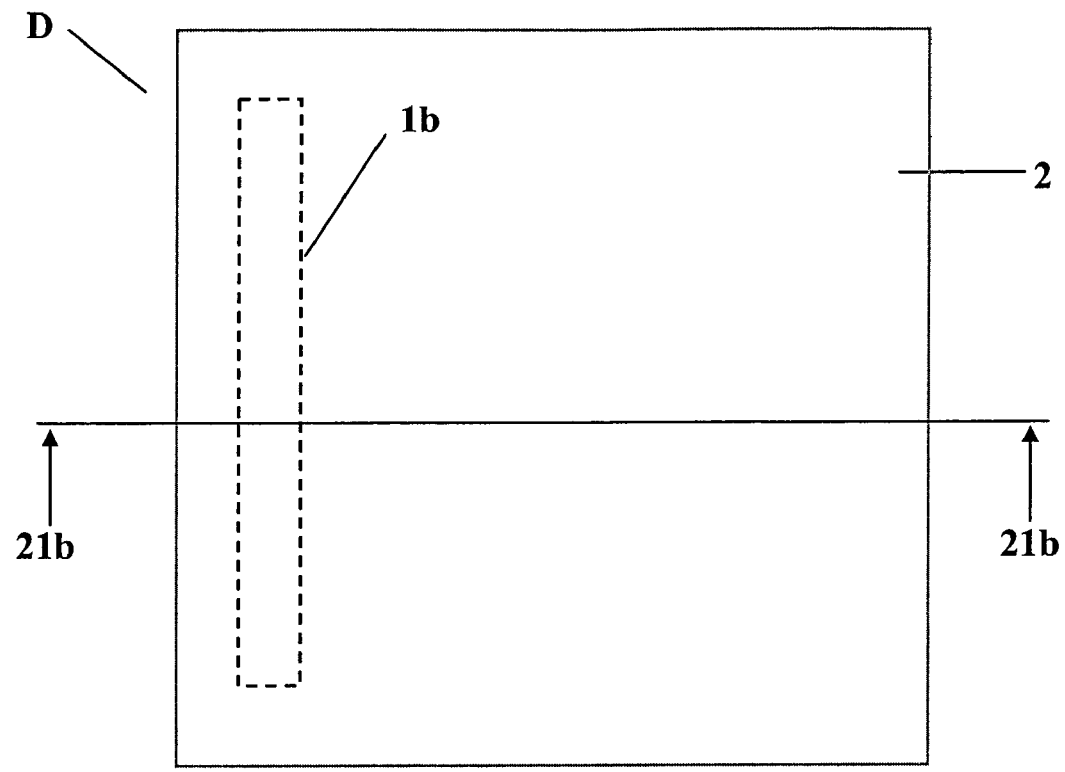
FIG. 21a is a bottom plan view of the preferred starting material of a cap wafer D and FIG. 21b is a cross-sectional view through the cap wafer D of FIG. 21a at line 21b—21b of the cap wafer D after opening of oxide holes.
Figure 21B:
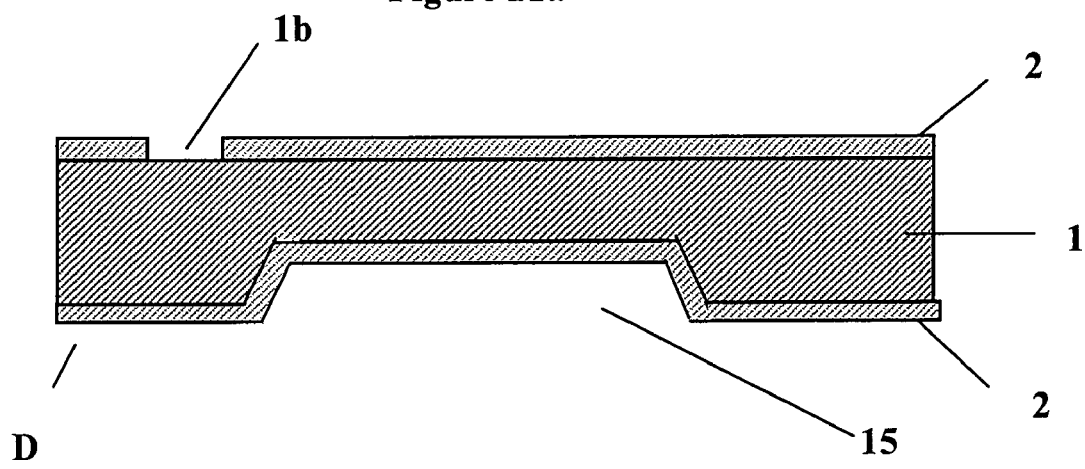

An opening 1b into the top silicon dioxide layer 2 to form silicon dioxide holes for front side silicon etching of wire bonding pad 8c is preferably carried out by photoresist lithography, dry etch of silicon dioxide and photoresist removal, as shown in FIGS. 21a and 21b.

The process preferably comprises:
1. Coating the top surface $SiO_2$ of the cap wafer D with a layer of photoresist,
2. Projecting light from an illuminator through a mask that contains the pattern, namely the place for the hole region on the top surface of cap wafer D,
3. Washing the exposed regions of the photoresist layer and leaving a mask on the top surface of the wafer D,
4. $CF_4/O_2$ plasma etch of silicon dioxide until the Silicon starts yielding a hole 1b into the top silicon dioxide layer 2,
5. Stripping the remaining photoresist layer.

Figure 22A:
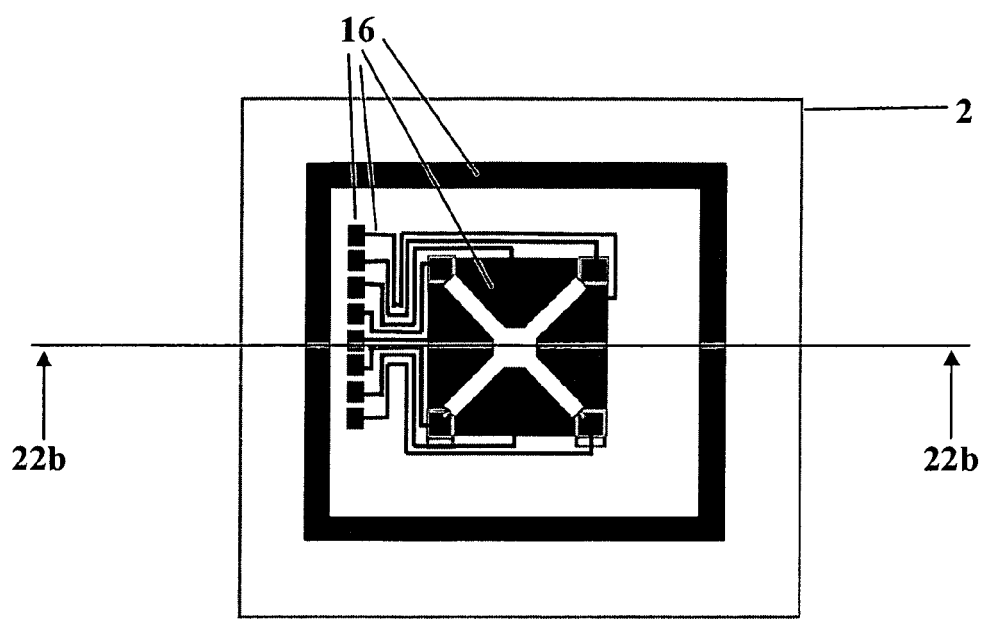
FIG. 22a is a bottom plan view of the preferred starting material of a cap wafer D and FIG. 22b is a cross-sectional view through the cap wafer D of FIG. 22a at line 22b—22b of the cap wafer D after backside metallization.
Figure 22B:
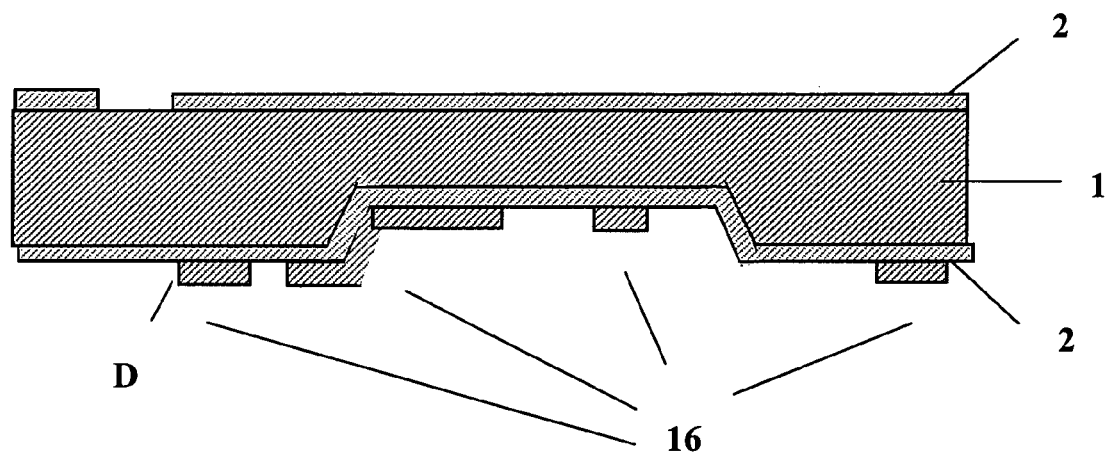

Then a backside metallization is preferably carried out by photoresist lithography and metal deposition and liftoff. Thereby Ti/Pt/Au 16 is attached on the backside of the wafer D, as shown in FIGS. 22a and 22b. The backside metallization can be applied by photoresist spray lithography, metal deposit and lift off or metal deposition, resist lithograph, and metal etching.

The process preferably comprises:
1. Coating the bottom surface of cap wafer D with a layer of photoresist,
2. Projecting light from an illuminator through a mask that contains the pattern, namely the places for seal ring Ti/Pt/Au 16 to be attached, on the bottom surface of wafer cap wafer D,
3. Washing the exposed regions of the photoresist layer and leaving a mask on the top surface of the wafer D,
4. Depositing Ti/PT/Au on the bottom surface of cap wafer D,
5. Depositing solder metal 12 on the bottom surface of cap wafer D,
6. Removing excess Ti/Pt/Au 16 and covering the photoresist by a metal lift-off process,
7. Stripping remaining photoresist yielding a Ti/Pt/Au 16.

Figure 23A:
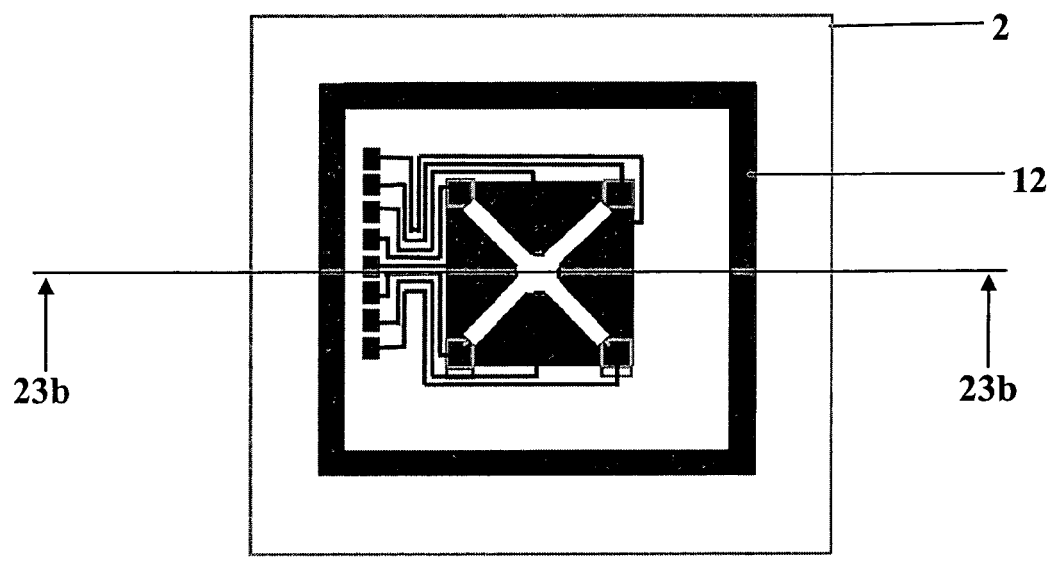
FIG. 23a is a bottom plan view of the preferred starting material of a cap wafer D and FIG. 23b is a cross-sectional view through the cap wafer D of FIG. 23a at line 23b—23b of the cap wafer D after backside solder metallization.
Figure 23B:
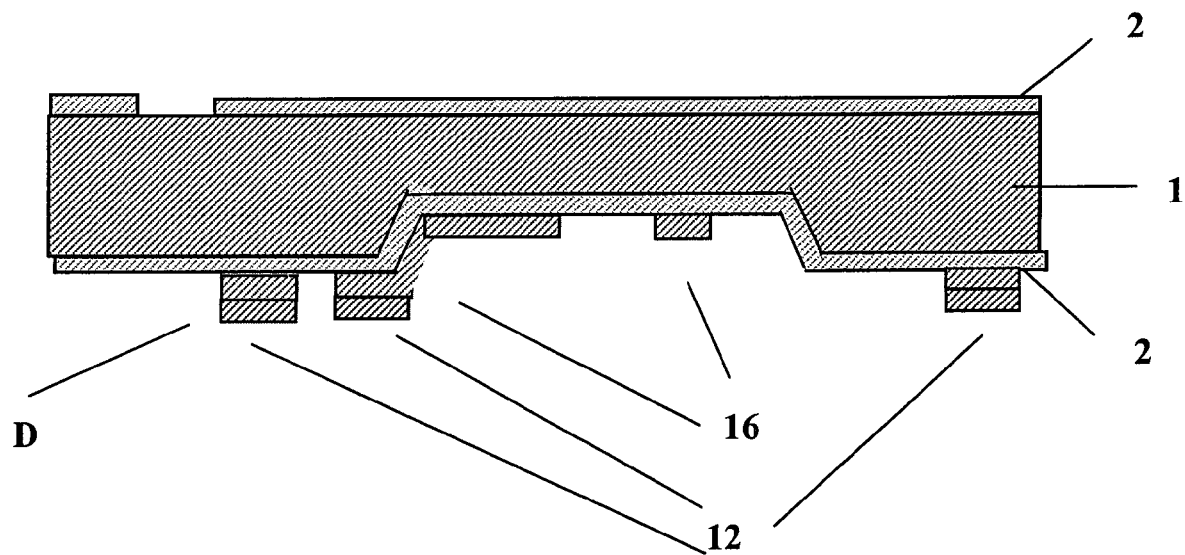

Then a backside metallization is preferably carried out to attach solder metal to the backside of the wafer D by photoresist lithography and metal deposition and liftoff. Thereby solder metal 12 is attached on the backside of the wafer D, as shown in FIGS. 23a and 23b. The backside metallization can be applied by photoresist spray lithography, metal deposit and lift off or metal deposition, resist lithograph, and metal etching.

The process preferably comprises:
1. Coating the bottom surface of cap wafer D with a layer of photoresist,
2. Projecting light from an illuminator through a mask that contains the pattern, namely the places for solder metal 12 to be attached, on the bottom surface of wafer cap wafer D,
3. Washing the exposed regions of the photoresist layer and leaving a mask on the top surface of the wafer D,
4. Depositing solder metal on Ti/Pt/Au 16 on the bottom surface of cap wafer D,
5. Depositing solder metal 12 on the bottom surface of cap wafer D,
6. Removing excess solder metal 12 and covering the photoresist by a metal lift-off process,
7. Stripping remaining photoresist yielding a solder metal 12.

Figure 24A:
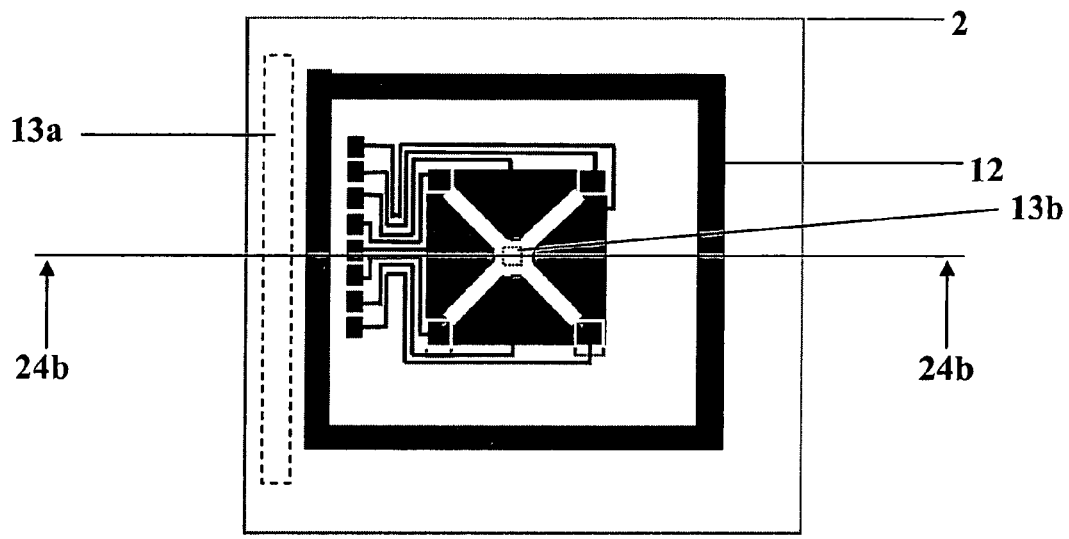
FIG. 24a is a bottom plan view of the preferred starting material of a cap wafer D and FIG. 24b is a cross-sectional view through the cap wafer D of FIG. 2a at line 24b—24b of the cap wafer D after formation of backside cavities.
Figure 24B:
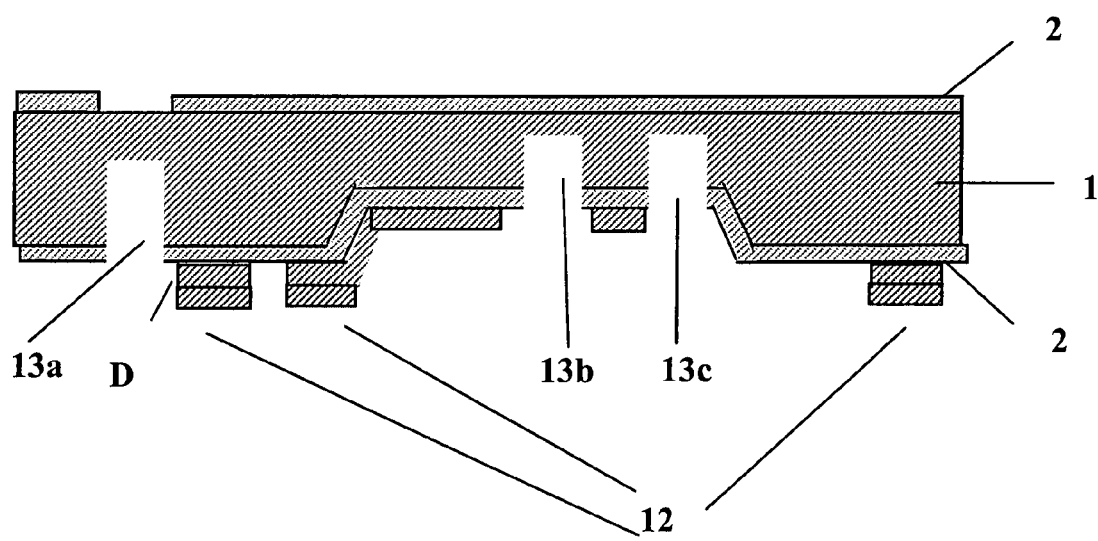

Then backside cavities 13a 13b and 13c are preferably formed on the cap wafer D by spray thick photoresist on the backside, DRIE etch $SiO_2$, DRIE cavities and remove photoresist, as shown in FIGS. 24a and 24b.

The process preferably comprises:
1. Coating the bottom silicon dioxide layer 2 of the cap wafer D with a layer of photoresist,
2. Projecting light from an illuminator through a mask that contains the pattern to be created on bottom layer 2 of the cap wafer D,
3. Washing the exposed regions of the photoresist layer and leaving an etch mask on the bottom silicon dioxide layer 2 of the cap wafer D,
4. Removing $SiO_2$ layer 2 of wafer D by $CF_4/O_2$ plasma etch,
5. Etching silicon layer 1 unprotected by photoresist by gases utilizing the deep reactive ion etch (DRIE) on the bottom of the cap wafer D, and
6. Removing photoresist from the bottom silicon dioxide layer 2 of the cap wafer D yielding cavities 13a, 13b and 13c.

Figure 25A:
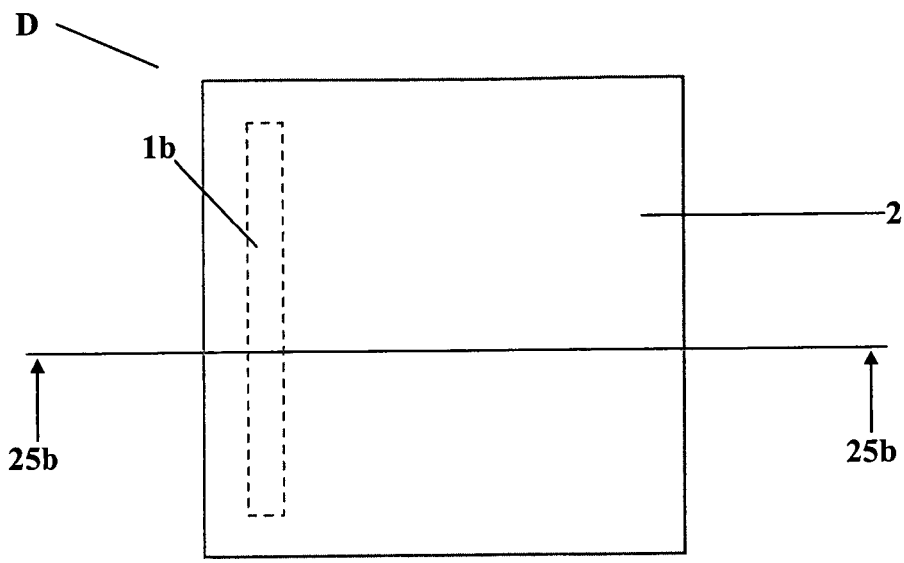
FIG. 25a is a top plan view of the preferred starting material of a cap wafer D and FIG. 25b is a cross-sectional view through the cap wafer D and the base wafer C of FIG.
Figure 25B:
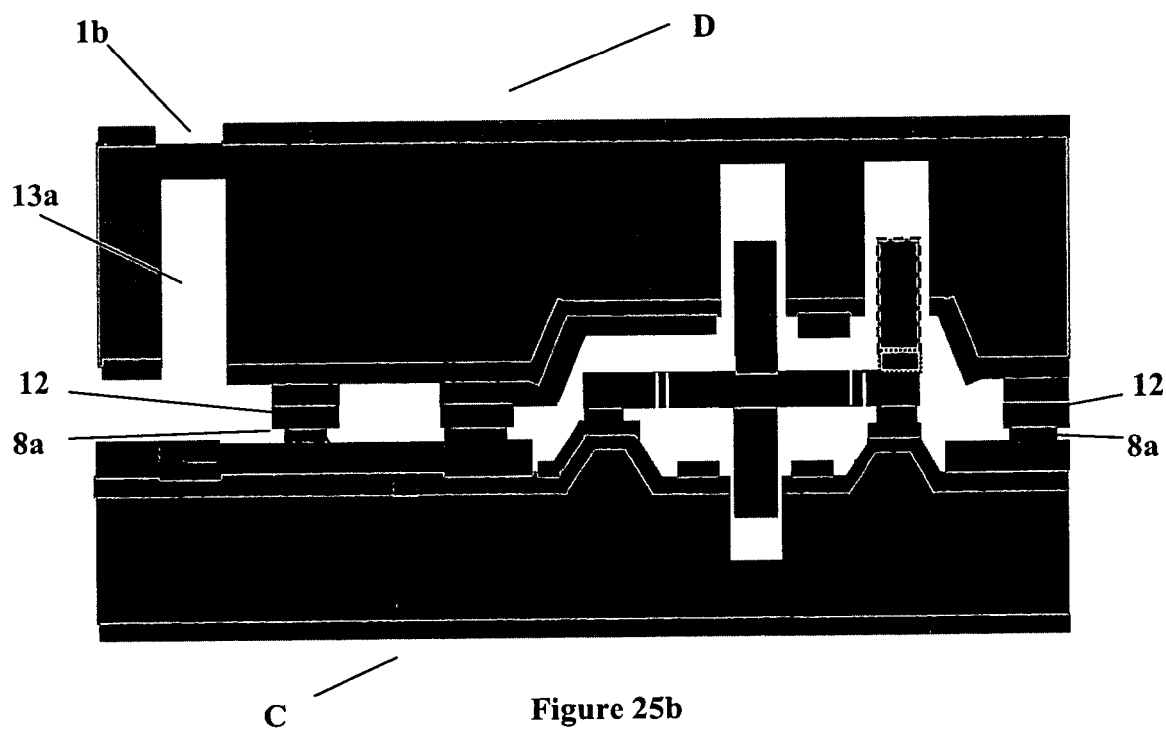

The cap wafer D is bonded to the base wafer C. The cap wafer D is positioned on top of base wafer C. A solder bond is preferably carried out at low temperature at about 200° C. between the solder metal 12 of the cap wafer D and the seal ring metal 8a of the base wafer C, as shown in FIGS. 25a and 25b.

Figure 26A:
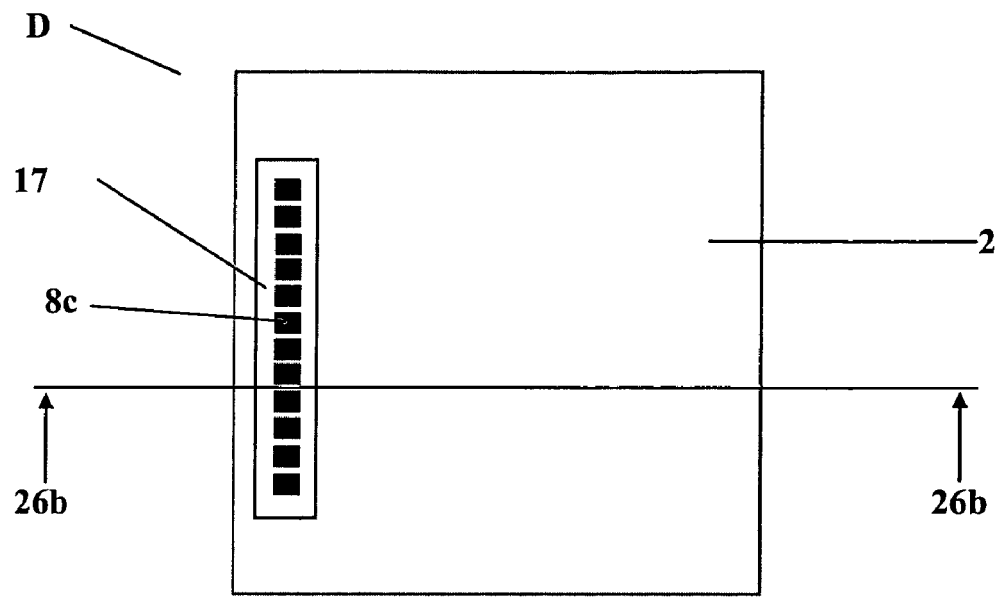
FIG. 26a is a top plan view of the preferred starting material of a cap wafer D and FIG. 26b is a cross-sectional view through the cap wafer D and the base wafer C of FIG. 26a at line 26b—26b of the cap wafer D bonded to the base wafer C after etching remaining silicon in the cap wafer D, to produce a channel for a wire dicing.
Figure 26B:
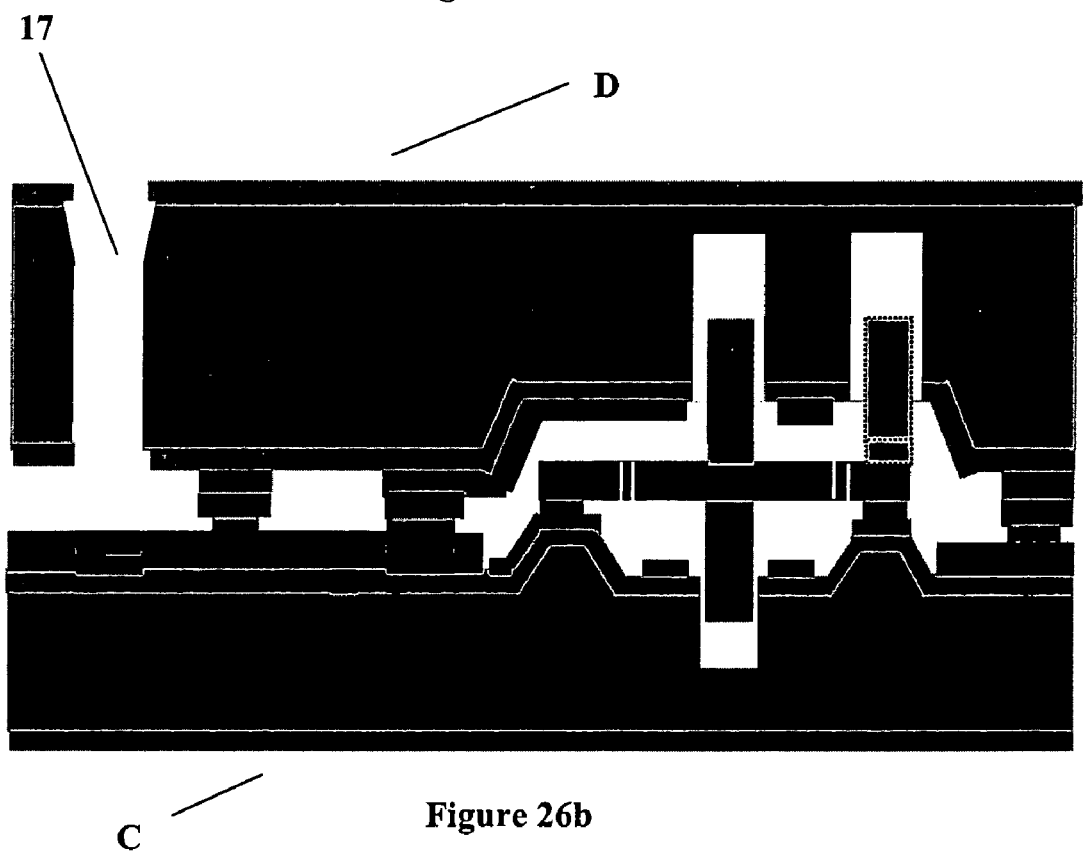

An opening 1b is preferably formed by wet etch (KOH) of silicon from the top of cap wafer D. The opening 1b combines with the cavity 13a to form a channel 17 for wire bonding as shown in FIGS. 26a and 26b.

The process preferably comprises:
Wet etching (KOH) of silicon from the top of the cap wafer D in the position of the hole 1b and generating a hole. The hole from the top of the cap wafer D forms with the cavity 13a from the bottom of the cap wafer D a channel 17.

Figure 27A:
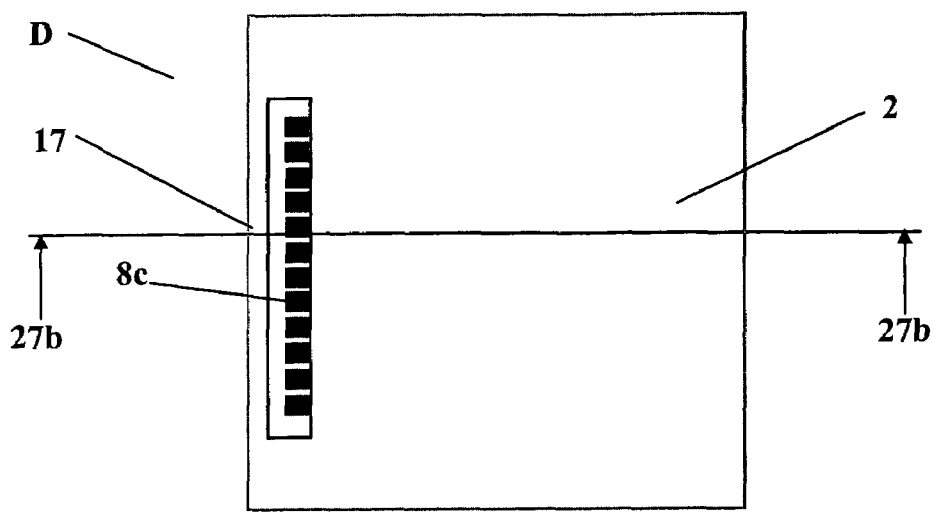
FIG. 27a is a top plan view of the preferred starting material of a cap wafer D and FIG. 27b is a cross-sectional view through the cap wafer D and the base wafer C of FIG. 27a at line 27b—27b of the cap wafer D bonded to the base wafer C after dicing and ball-bonding of wires.
Figure 27B:
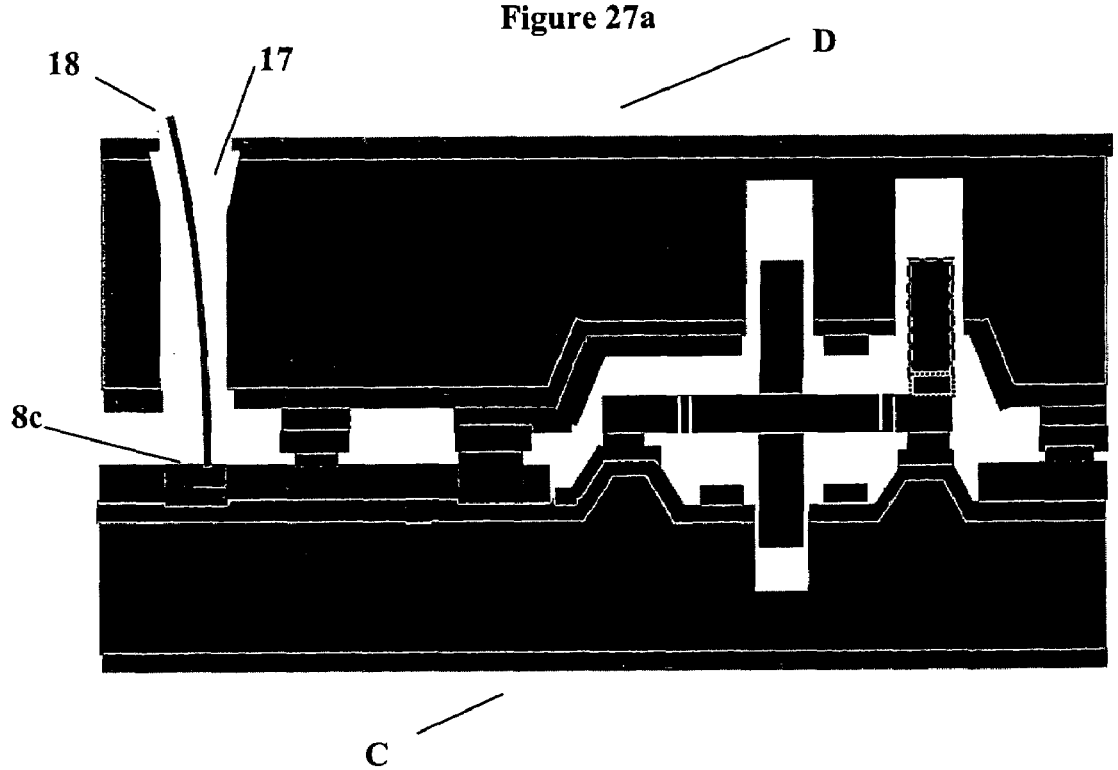

A ball bonding of wires 18 by vacuum oven bake is carried out as shown in FIGS. 27a and 27b. The process preferably comprises leading a wire 18 from the top of the cap wafer D through channel 17 and attaching the wire to the wire bonding pad Ti/Pt/Au 8c on the bottom wafer C.

Differential sensing for capacitive sensors can be implemented on in-plane devices where the motion to be detected and controlled is in the lateral direction. The accurate alignment coupled with new wafer-level vacuum packaging techniques and anisotropic DRIE provide the capabilities of fabricating the inventive structure. It is not known to apply the wafer-level vacuum packaging method of the present invention. The present invention provides a unique method of device assembly during vacuum packaging.

Although certain preferred embodiments of the present invention have been described above, these should not be construed as limiting the scope of the invention but as merely providing illustrations of some of the presently preferred embodiments of this invention. Those skilled in the art will appreciate the fact that both the order in which the described processes are carried out and the described process parameters may be varied if needed to suit local requirements.

What I claim is:

1. A method of manufacturing a cloverleaf microgyroscope containing an integrated post comprising:
   a) attaching a post wafer to a resonator wafer,
   b) forming a bottom post from the post wafer,
   c) attaching the resonator wafer to a base wafer, wherein the bottom post fits into a post hole in the base wafer,
   d) forming a top post from the resonator wafer, wherein the bottom and top post are formed symmetrically around the same axis,
   e) preparing a cap with backside metallization, and
   f) attaching a cap wafer on top of the base wafer.

2. The method according to claim 1, wherein the top post is formed of a bulk silicon base having a thickness of $\leqq 500$ μm, a silicon dioxide layer of $\leqq 2$ μm and a heavily-doped Silicon epi-layer of 10 μm–20 μm, p-type, 1e19–1e20 cm$^{-3}$.

3. The method according to claim 1, wherein the bottom post is formed of a bulk silicon base having a thickness of $\leqq 500$ μm and a silicon dioxide layer of $\leqq 2$ μm.

4. The method according to claim 1, wherein the base wafer is manufactured of substrate containing moderately doped silicon substrate p-type, 1e19 cm$^{-3}$ with a thickness of about $\leqq 800$ μm.

5. The method according to claim 1, wherein ohmic contacts and interconnect metals containing Al or Al/Ti are formed preferably on the base wafer before the resonator wafer is attached to the base wafer.

6. The method according to claim 1, wherein electrodes, bond pad, and wire bond metal are formed on the base wafer before the resonator wafer is attached to the base wafer.

7. The method according to claim 2, wherein electrodes, bond pad, and wire bond metal are formed on the base wafer before the resonator wafer is attached to the base wafer.

8. The method according to claim 1, wherein a seal ring containing Ti/Pt/Au is formed on the base wafer before the resonator wafer is attached to the base wafer.

9. The method according to claim 1, wherein the cap wafer is manufactured of lightly doped bulk silicon having a thickness of $\leqq 800$ μm.

10. The method according to claim 1, wherein an opening is prepared in the cap wafer, a wire is led through the opening in the cap wafer and bonded to a bonding pad on the base wafer.

11. The method according to claim 1, wherein parts of a heavily doped silicon layer of the resonator wafer are removed by resist lithography and photoresist removal.

12. The method according to claim 1, wherein the bondage between a heavily doped silicon epi-layer of the resonator wafer and a silicon dioxide layer of the post wafer is achieved by heating at a temperature from 800° C. to 1000° C.

13. The method according to claim 1, wherein a bulk silicon layer and a silicon dioxide layer of the post wafer are partially removed to yield the bottom post by resist lithography, $CF_4/O_2$ plasma etch $SiO_2$ and removal of photoresist.

14. The method according to claim 1, wherein the bonding of the resonator wafer to the base wafer is carried out by an Au to Au thermo-compression bonding at temperature from 200° C. to 500° C.

15. The method according to claim 1, wherein a bulk silicon layer and a silicon dioxide of the resonator wafer are partially removed to yield a top post by resist lithography, $CF_4/O_2$ plasma etch of $SiO_2$ and removal of photoresist.

16. The method according to claim 1, wherein the bondage between the cap wafer and the base wafer is carried out with solder metal at temperature at about 100° C. to 300° C.

17. The method according to claim 1, wherein a hole in the cap wafer is formed by wet etch of silicon and vacuum oven baking.

18. The method according to claim 1, wherein a wire bonding is carried out by saw cutting of cap wafer and ball bonding of wires to wire bonding pad of the base wafer.

19. A cloverleaf micro gyroscope with off-chip electronics manufactured by this method according to claim 1 comprising
   a) attaching a post wafer to a resonator wafer,
   b) forming a bottom post from the post wafer,
   c) attaching the resonator wafer to a base wafer, wherein the bottom post fits into a post hole in the base wafer,
   d) forming a top post from the resonator wafer, wherein the bottom and top post are formed symmetrically around the same axis,
   e) preparing a cap with backside metallization, and
   g) attaching a cap wafer on top of the base wafer.

20. A cloverleaf micro gyroscope with off-chip electronics comprising:
   a post wafer attached to a resonator wafer;
   a top post and a bottom post formed from the post wafer, wherein the bottom and top post are formed symmetrically around the same axis;
   a base wafer attached to the resonator wafer, wherein the bottom post fits into a post hole in the base wafer;
   a cap with backside metallization attached to the base wafer.

* * * * *